(12) United States Patent
Fujita et al.

(10) Patent No.: US 9,137,860 B2
(45) Date of Patent: Sep. 15, 2015

(54) ILLUMINATION LIGHT SOURCE AND LIGHTING APPARATUS

(71) Applicant: Panasonic Corporation, Osaka (JP)

(72) Inventors: Hiroshi Fujita, Osaka (JP); Kazuhiko Itoh, Osaka (JP); Yoshiaki Hachiya, Shiga (JP); Kazuo Gouda, Kagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/193,624

(22) Filed: Feb. 28, 2014

(65) Prior Publication Data
US 2014/0252946 A1 Sep. 11, 2014

(30) Foreign Application Priority Data

Mar. 8, 2013 (JP) ................. 2013-047326

(51) Int. Cl.
*H05B 37/00* (2006.01)
*H05B 33/08* (2006.01)
*H02M 1/44* (2007.01)

(52) U.S. Cl.
CPC ............ *H05B 33/0803* (2013.01); *H02M 1/44* (2013.01); *H05B 37/00* (2013.01)

(58) Field of Classification Search
USPC ..................... 315/56, 32, 363, 224
See application file for complete search history.

(56) References Cited

U.S. PATENT DOCUMENTS

| 5,006,763 | A | 4/1991 | Anderson |
| 6,144,169 | A * | 11/2000 | Janczak ................. 315/224 |
| 6,331,064 | B1 | 12/2001 | Nishiyama et al. |
| 7,701,153 | B2 | 4/2010 | Itou et al. |
| 2011/0260638 | A1 | 10/2011 | Gotay et al. |
| 2012/0025706 | A1 * | 2/2012 | Wang et al. ................ 315/35 |

OTHER PUBLICATIONS

European Search Report for corresponding European patent application No. 14157785.8, dated Jun. 25, 2014.

* cited by examiner

*Primary Examiner* — David H Vu
(74) *Attorney, Agent, or Firm* — Renner, Otto, Boisselle & Sklar, LLP

(57) ABSTRACT

A light bulb-shaped lamp according to the present invention includes: a board on which an LED is mounted; a circuit board on which a drive circuit that turns on the LED is mounted; output wires for supplying power for turning on the LED from the drive circuit to the LED; a pedestal; and a potential-stabilizing wire electrically connecting the pedestal to a circuit ground of the drive circuit.

17 Claims, 12 Drawing Sheets

ILLUMINATION LIGHT SOURCE AND LIGHTING APPARATUS

CROSS REFERENCE TO RELATED APPLICATION

The present application is based on and claims priority of Japanese Patent Application No. 2013-047326 filed on Mar. 8, 2013. The entire disclosure of the above-identified application, including the specification, drawings and claims is incorporated herein by reference in its entirety.

FIELD

The present invention relates to illumination light sources and lighting apparatuses, and particularly relates to a lamp using a light-emitting diode (LED).

BACKGROUND

LEDs are expected to become the standard light source for various kinds of conventional lamps, such as fluorescent and incandescent bulbs, due to their high-efficiency and long life span. As such, research and development of lamps using LEDs (LED lamps) is progressing.

LED lamps include, for instance, bulb-shaped LED lamps to be used as a substitute for fluorescent and incandescent bulbs, and straight tube LED lamps to be used as a substitute for straight fluorescent tubes having electrode coils at both ends. Likewise, development of drive circuitry for driving LEDs is also progressing (for example, see Patent Literature (PTL) 1).

CITATION LIST

Patent Literature

[PTL 1] U.S. Pat. No. 7,701,153

SUMMARY

Technical Problem

This sort of drive circuit generates noise when driven. As such, when this drive circuit is used to light up LEDs, noise corresponding to the noise generated in the drive circuit manifests in the wiring for supplying power from the drive circuit to the LEDs. This noise that manifests in the wiring propagates through and radiates from metal components in the LED lamp. The noise propagating through the metal components in the LED lamp further propagates through the lighting fixture to which the LED lamp is attached. Consequently, noise radiates from the lighting fixture as well.

In an effort to reduce noise generated by lighting fixtures and the like to prevent radio interference with other devices, this type of noise is regulated under, for example, Comite international Special des Perturbations Radioelectriques (CISPR) standard CISPR 15. Consequently, it is necessary to provide the illumination light source and the lighting fixture with noise suppression measures.

The present invention was conceived to solve this sort of problem, and aims to provide an illumination light source and a lighting apparatus capable of suppressing noise.

Solution to Problem

In order to achieve the above goal, the illumination light source according to an aspect of the present invention includes: a module board on which a light-emitting element is mounted; a circuit board on which a drive circuit that turns on the light-emitting element is mounted; an output wire for supplying power for turning on the light-emitting element from the drive circuit to the light-emitting element; a metal component; and a reference potential wire electrically connecting the metal component to a reference potential of the drive circuit.

Moreover, the metal component may be a metallic structural component.

Moreover, the metal component may be a pedestal that supports the module board.

Moreover, the metal component may be a heat sink that is thermally connected to the module board via the pedestal, the heat sink being for dissipating heat generated by the light-emitting element, and the heat sink may surround the drive circuit.

Moreover, the heat sink may include an opening portion into which the pedestal is fit, and the reference potential wire may be pinched between the pedestal and the opening portion of the heat sink.

Moreover, the pedestal may be elongated.

Moreover, the illumination light source may further include a low-profile case that houses the module board and the circuit board.

Moreover, the reference potential wire may be wound around the metal component.

Moreover, the illumination light source may further include: a capacitor connected in series with the reference potential wire, between the reference potential of the drive circuit and the metal component.

Moreover, the reference potential wire may be a stranded wire.

Moreover, the reference potential of the drive circuit may be a ground potential of the drive circuit.

Moreover, the drive circuit may include: a direct current power source circuit that converts a first alternating current voltage inputted to the illumination light source to direct current voltage and outputs the converted direct current voltage; and a high frequency generator circuit that includes an inverter circuit including a switching element, an inductor, and a capacitor, and converts the direct current voltage outputted from the direct current power source circuit to a second alternating current voltage of higher frequency than a frequency of the first alternating current voltage, and the output wire may have a potential that varies in synchronization with a switching operation of the switching element.

Moreover, the present invention may be realized not only as an illumination light source, but also as a lighting apparatus including the illumination light source.

Advantageous Effects

With the present invention, an illumination light source and a lighting apparatus capable of suppressing noise can be realized.

BRIEF DESCRIPTION OF DRAWINGS

These and other objects, advantages and features of the invention will become apparent from the following description thereof taken in conjunction with the accompanying drawings that illustrate a specific embodiment of the present invention.

DESCRIPTION OF EMBODIMENTS

Hereinafter the illumination light source and the lighting apparatus according to the embodiments of the present invention will be described with reference to the drawings. It should be noted that the drawings are schematic diagrams, and do not necessarily provide a strictly accurate illustration.

The exemplary embodiments described below each show a preferable, specific example. The numerical values, shapes, materials, constituent elements, the arrangement and connection of the constituent elements, and others indicated in the following exemplary embodiments are mere examples, and therefore do not intend to limit the inventive concept. Therefore, among the constituent elements in the following exemplary embodiments, constituent elements not recited in any of the independent claims are described as optional constituent elements.

Embodiment 1

In Embodiment 1, the illumination light source will be exemplified as a bulb-shaped LED lamp (LED bulb).
(Light Bulb-Shaped Lamp Overall Structure)

First, the overall structure of the light bulb-shaped lamp according to Embodiment 1 will be described with reference to FIG. 1A, FIG. 1B, and FIG. 2.

Figure 1A:
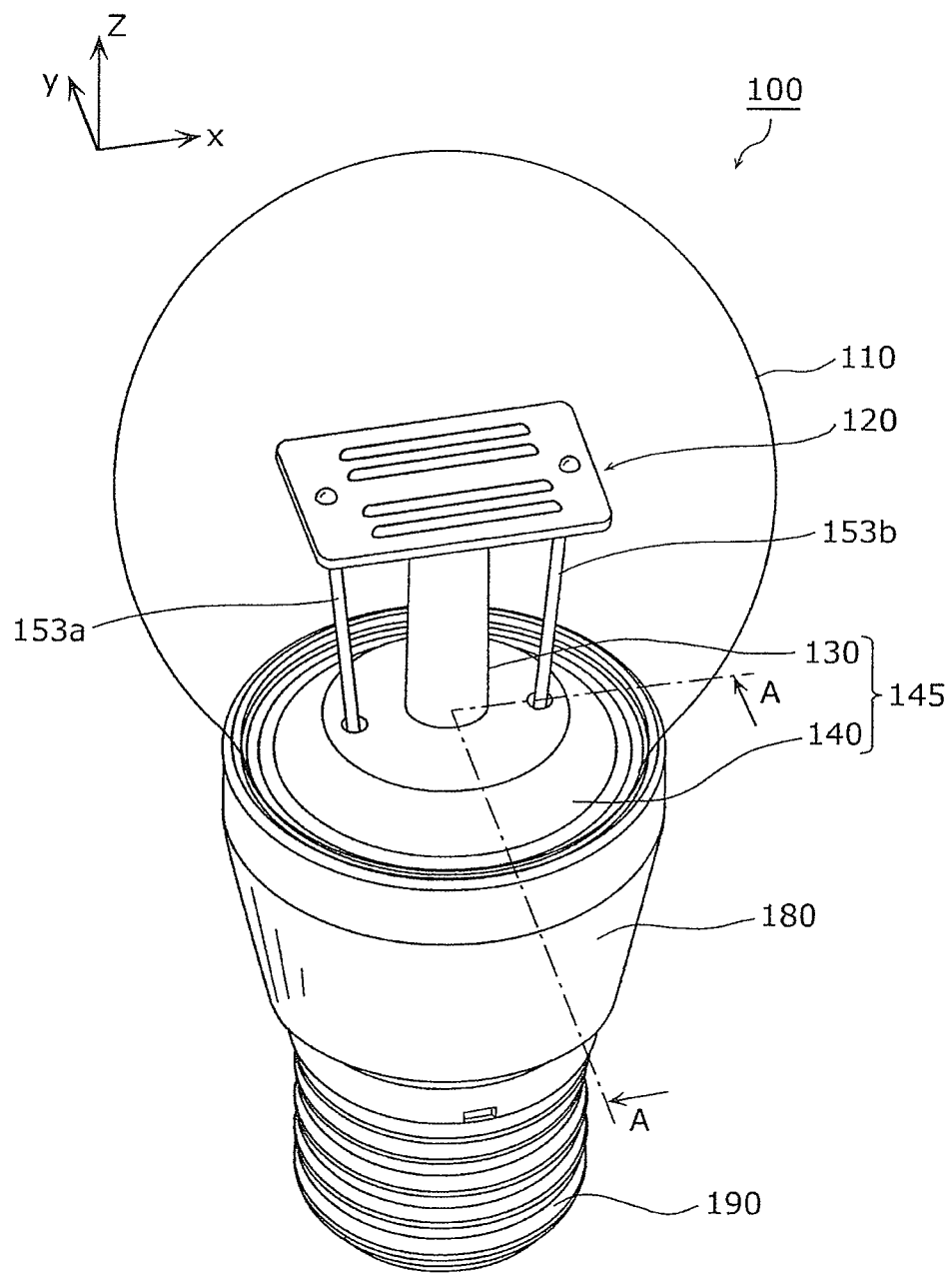
FIG. 1A is an external perspective view of the light bulb-shaped lamp according to Embodiment 1.
Figure 1B:
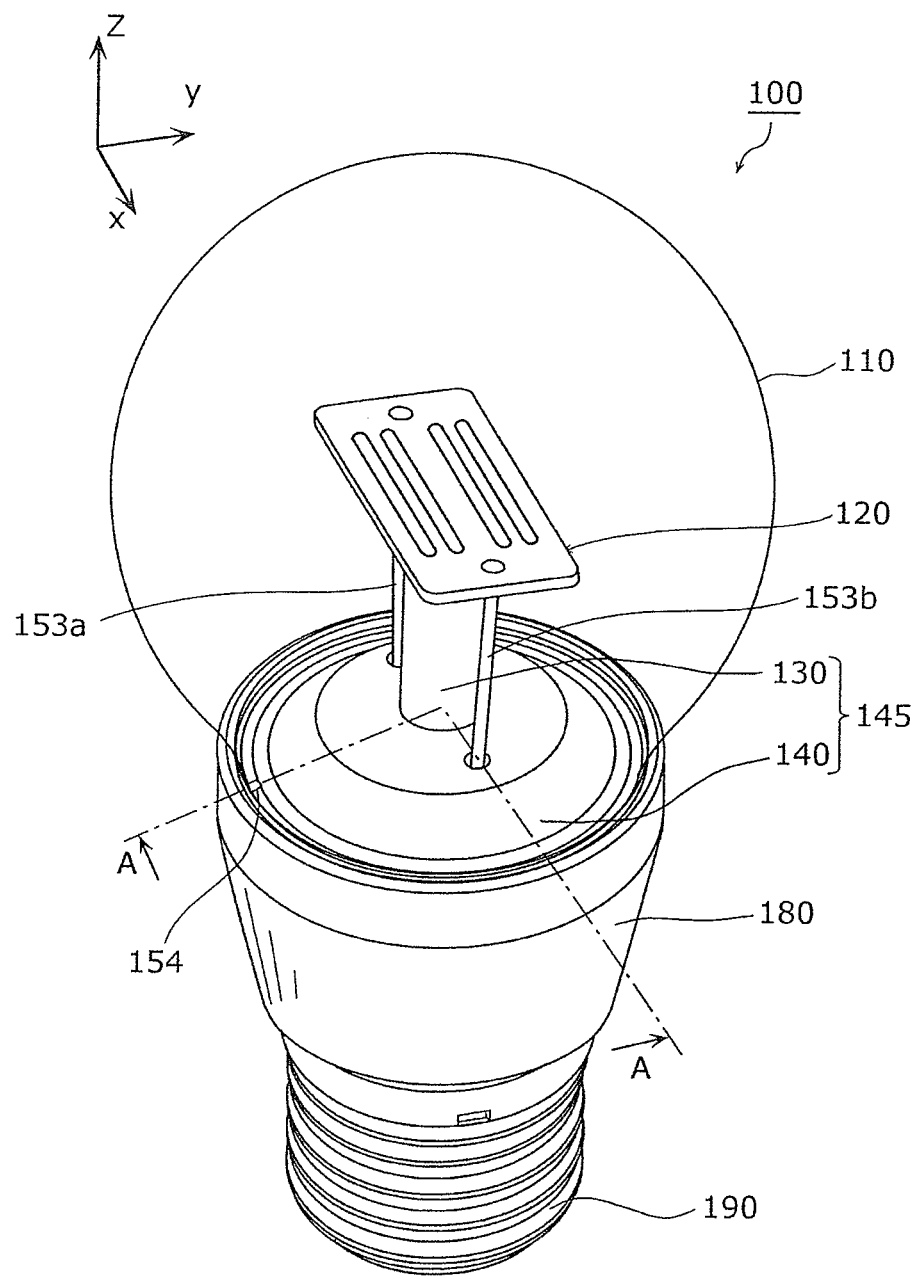
FIG. 1B is an external perspective view of the light bulb-shaped lamp according to Embodiment 1 as seen from a different angle than illustrated in FIG. 1A.

FIG. 1A and FIG. 1B are external perspective views of the Light bulb-shaped lamp according to Embodiment 1.

As FIG. 1A and FIG. 1B show, the light bulb-shaped lamp 100 according to Embodiment 1 is a substitute for a light bulb-shaped fluorescent or incandescent light.

The light bulb-shaped lamp 100 includes a globe 110, an LED module 120 which is an example of a light-emitting module, and a pedestal 145 which includes a support 130 and a mounting 140.

In Embodiment 1, the light bulb-shaped lamp 100 further includes a drive circuit 150, a potential-stabilizing wire 154 (reference potential wire), a circuit case 160, a heat sink 170, an outer case 180, and a base 190.

It should be noted that the external enclosure of the light bulb-shaped lamp 100 consists of the globe 110, the outer case 180, and the base 190.

Next, constituent elements of the light bulb-shaped lamp 100 according to Embodiment 1 will be described with reference to FIG. 2.

Figure 2:
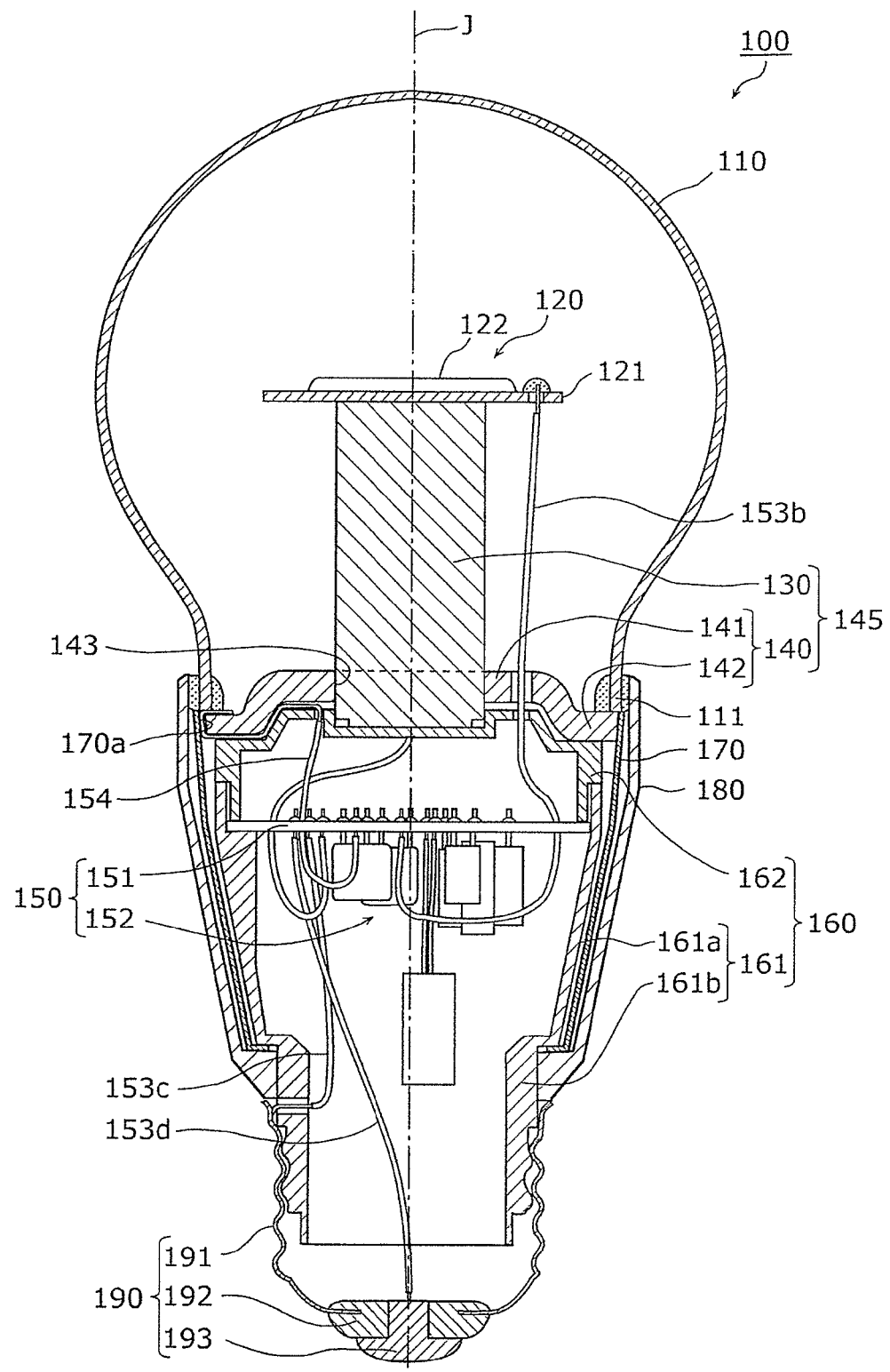
FIG. 2 is a cross section of the light bulb-shaped lamp according to Embodiment 1.

FIG. 2 is a cross section of the light bulb-shaped lamp 100 according to Embodiment 1, and more specifically is a cross section at the line A-A' shown in FIG. 1A and FIG. 1B.

It should be noted that the vertically drawn dashed and dotted line in FIG. 2 indicates a lamp axis J of the light bulb-shaped lamp (central axis). In Embodiment 1, the lamp axis J is the same as the axis of the globe 110 (globe axis). The lamp axis J indicates the center of rotation when the light bulb-shaped lamp 100 is attached to the socket of a lighting apparatus (not illustrated), and is the same as the rotation axis of the base 190. In FIG. 2, a side view of the drive circuit 150 is illustrated, not a cross sectional view.
(Globe)

As is illustrated in FIG. 2, the globe 110 is a substantially hemispherical, light-transmissive cover for allowing the light emitted by the LED module 120 to exit the lamp. The globe 110 according to Embodiment 1 is a glass bulb (clear bulb) made of silica glass transparent to visible light. This allows the LED module 120 housed in the globe 110 to be visually recognizable from outside the globe 110.

The LED module 120 is covered by the globe 110. Consequently, light from the LED module 120 that is incident on the inner surface of the globe 110 passes through and exits the globe 110. In Embodiment 1, the globe 110 is formed so as to house the LED module 120.

The globe 110 is shaped so as to have a spherically closed end and an opening portion 111 at the other end. Specifically, the globe 110 is shaped such that a portion of the hollow sphere extends to be narrow in a direction away from the center of the sphere, and the opening portion 111 is formed at a position distant from the center of the sphere.

A glass bulb having a shape similar to those of general light bulb-shaped fluorescent lights and general incandescent light bulbs can be used as this sort of globe 110. For example, a glass bulb such as a type-A, type-G, or type-E bulb can be used as the globe 110.

Further, the opening portion 111 of the globe 110 is placed on the surface of the mounting 140, for example, and then an adhesive such as a silicone resin is applied between the mounting 140 and the outer case 180, thereby fixing the globe 110.

It should be noted that the globe 110 does not necessarily need to be transparent to visible light, and may be designed to diffuse light. For example, a resin or white pigment that contains a light diffusion material such as silica or calcium carbonate is applied onto the entire inner or external surface of the globe 110, thereby forming a milky light diffusion film. The light diffusing function given to the globe 110 allows light incident from the LED module 120 on the globe 110 to be diffused, thus increasing a light distribution angle of the light bulb-shaped lamp 100.

Further, the shape of the globe 110 is not limited to a type-A shape, and may be a spheroid or oblate spheroid. The material of the globe 110 is not limited to glass; a resin such as acrylic (polymethyl methacrylate (PMMA)) or polycarbonate (PC) may be used.
(LED Module)

The LED module 120 is a light-emitting module which includes a light-emitting element, and emits light of a predetermined color (wavelength), such as white.

As FIG. 2 illustrates, the LED module 120 is disposed inside the globe 110, and is preferably disposed at the center position of the spherical shape formed by the globe 110 (for example, inside of a large diameter portion of the globe 110, which is a portion of the globe 110 where the diameter thereof is large).

In this way, light distribution characteristics similar to those of a conventional incandescent light bulb using a filament coil can be achieved by placing the LED module 120 at the center position of the globe 110.

Further, the LED module 120 is held mid-air in the globe 110 by the support 130, and emits light using power supplied from the drive circuit 150 via the output wires 153a and 153b. In Embodiment 1, the LED module 120 is held by the support 130 by a board 121 of the LED module 120.

The LED module 120 according to Embodiment 1 has a chip on board (COB) structure in which a bare chip is directly mounted on the board 121. Hereinafter constituent elements of the LED module 120 will be described.

First is a description of the board 121. The board 121 is a mounting board on which the LEDs 122 are mounted. The LEDs 122 are mounted on a first main surface (front surface) of the board 121 and a second main surface opposite the first main surface (back surface) of the board 121.

The board 121 is connected to an end of the support 130. More specifically, the board 121 and the support 130 are connected such that the second main surface of the board 121 and the end surface of the support 130 are in contact.

A board having a low transmittance of light emitted from the LEDs 122 can be used as the board 121. Examples of such a board include white substrates such as a white alumina board whose total transmittance is 10% or less, resin-coated metal boards (metal base boards), and the like.

The use of a board having a low light transmittance helps in preventing light from passing through the board 121 and being emitted from the second main surface, thereby avoiding the occurrence of color unevenness. In addition, an inexpensive white substrate can be used, contributing to cost reduction.

A light-transmissive board having a high light transmittance can also be used as the board 121. The use of a light-transmissive board allows light from the LEDs 122 to pass through the board 121, and to be emitted also from a surface (back surface) on which the LEDs 122 are not mounted.

Thus, even if the LEDs 122 are mounted only on the first main surface (front surface) of the board 121, light is also emitted from the second main surface (back surface), and thus light distribution characteristics equivalent to those of an incandescent light bulb can be achieved. In addition, light can be omnidirectionally emitted from the LED module 120, making it is possible to achieve omnidirectional light distribution characteristics.

Examples that can be used as a light-transmissive board include boards whose total transmittance to visible light is 80% or more, and boards transparent to visible light (in other words, boards having extremely high transmittance, which allows the view on the other side to be seen through the board). A light-transmissive ceramics board made of polycrystalline alumina or aluminum nitride, a clear glass board made of glass, a crystal substrate made of crystal, a sapphire substrate made of sapphire, a transparent resin board made of a transparent resin material, or the like can be used as such a light-transmissive board.

In Embodiment 1, a white polycrystalline-ceramics board made of sintered alumina is used as the board 121. For example, a white alumina board having a thickness of 1 mm and a light reflectance of 94% or a white alumina board having a thickness of 0.635 mm and a light reflectance of 88% can be used as the board 121.

It should be noted that a resin board, a flexible board, or a metal base board can also be used as the board 121. Further, the shape of the board 121 is not limited to a rectangle. Different shapes, such as a square or a circle, can also be used.

The board 121 has two insertion holes for electrical connection with the two output wires 153a and 153b. Tip portions of the output wires 153a and 153b pass through the insertion holes and are connected to the board 121, thereby electrically connecting the output wires 153a and 153b to the LEDs 122.

Next is a description of the LEDs 122. The LED 122 is an example of a light-emitting element, and is a semiconductor light-emitting element which emits light by consuming predetermined power. All the LEDs 122 on the board 121 are of the same type and selected so as to have the same VF characteristics.

The LEDs 122 are bare chips which emit single-color visible light. In the Embodiment 1, blue LED chips which emit blue light by being electrically connected are used. As a blue LED chip, for example, a gallium nitride-based semiconductor light-emitting element can be used which is formed using InGaN based material and the center wavelength of which is at least 440 nm and at most 470 nm.

The LEDs 122 are mounted only on the first main surface (front surface) of the board 121, in a plurality of lines along a longitudinal side of the board 121. In Embodiment 1, 48 LEDs 122 are disposed on the board 121 in order to achieve a brightness of about 60 watts. More specifically, 48 LEDs 122 are disposed on the first main surface (front surface) of the board 121 in four parallel lines of 12 LEDs 122.

It should be noted that although a plurality of the LEDs 122 are mounted on the board 121 in Embodiment 1, the number of the mounted LEDs 122 may be changed appropriately according to the usage of the light bulb-shaped lamp 100. Moreover, in Embodiment 1, each line of 12 LEDs 122 is individually coated with a sealing component.

(Support)

As illustrated in FIG. 2, the support 130 is an elongated component extending from the vicinity of the opening portion 111 of the globe 110 toward the inside of the globe 110. In Embodiment 1, the axis of the support 130 extends along the lamp axis J. In other words, the axis of the support 130 and the lamp axis J are parallel.

The support 130 functions as a support component which holds the LED module 120, and the LED module 120 is connected to an end of the support 130. In other words, the LED module 120 is fixed at a predetermined position inside the globe 110 by the support 130.

In this manner, attaching the LED module 120 to the support 130 extending toward the inside of the globe 110 achieves wide light distribution characteristics similar to that of an incandescent light bulb. The mounting 140 is connected to the other end of the support 130.

The support 130 also functions as a heat dissipation component (heat sink) for dissipating heat generated by the LED module 120 (the LEDs 122). As such, the support 130 is preferably formed using a metal material mainly containing aluminum (Al), copper (Cu), and iron (Fe) or the like, or a resin material having high thermal conductivity.

This allows heat generated by the LED module 120 to be efficiently conducted to the mounting 140 via the support 130. It should be noted that the support 130 preferably has higher thermal conductivity than the board 121. In Embodiment 1, the material of the support 130 is aluminum.

An end of the support 130 on the top side of the globe 110 is connected to the central portion of the board 121 of the LED module 120, whereas the other end of the support 130 on the base 190 side is connected to the central portion of the mounting 140.

It should be noted that in Embodiment 1, the support 130 is fixed to the mounting 140, passing through a through-hole 143 in the mounting 140.

The board 121 of the LED module 120 and an end surface of the support 130 are firmly attached using an adhesive such as a silicone resin. Consequently, an adhesive may be present between the board 121 and the end surface of the support 130. In this case, the thickness of the silicone resin is preferably 20 micrometers or less, in consideration of the thermal conductivity of the board 121 and the support 130.

In addition, the board 121 and the support 130 may be fixed using, for example, a screw, rather than an adhesive. In this case, the surfaces of the board 121 and the support 130 may have minute unevenness, depending on the material or processing technique used, and thus a minute space may be present between the second main surface of the board 121 and the end surface of the support 130. Even if there is such a minute space, the board 121 and the support 130 can be considered to be substantially in contact if the space has a size of about 20 micrometers at most.

For the support 130, for example, a solid-structured cylindrical shape is used which has a constant cross-sectional area (an area in a cross section obtained when the support 130 is cut through along a plane normal to the axis thereof).

It should be noted that the support 130 does not need to have a shape whose cross-sectional area is constant, and may have a shape whose cross-sectional area changes at one or more points, such as a shape obtained by combining a column and a square pillar.

(Mounting)

The mounting 140 is a support base for holding the support 130. As FIG. 2 illustrates, the mounting 140 is formed so as to close the opening portion 111 of the globe 110. The mounting 140 is connected to the heat sink 170. In Embodiment 1, the mounting 140 is fitted in an opening portion 170a of the heat sink 170 such that the outer circumference of the mounting 140 is in contact with the inner surface of the heat sink 170.

The mounting 140 also functions as a heat dissipation component (heat sink) for dissipating heat generated by the LED module 120 (the LEDs 122). As such, the mounting 140 is preferably formed using a metal material which mainly contains aluminum (Al), copper (Cu), or iron (Fe), or a resin material having high thermal conductivity. This allows heat to be efficiently conducted from the support 130 to the heat sink 170. In Embodiment 1, the material of the mounting 140 is aluminum.

Next, the structure of the mounting 140 will be described in detail with reference to FIG. 2. As illustrated in FIG. 2, the mounting 140 is a disc-shaped component having a step, and includes a small diameter portion 141 having a smaller diameter and a large diameter portion 142 having a larger diameter. The small diameter portion 141 and the large diameter portion 142 form the step.

For example, the small diameter portion 141 has a thickness of about 3 mm and a diameter of about 18 mm, whereas the large diameter portion 142 has a thickness of about 3 mm and a diameter of about 42 mm. It should be noted that the step has a height of about 4 mm, for example.

In Embodiment 1, the small diameter portion 141 includes the through-hole 143 for fixing the support 130 in a state where the end portion thereof is passing through the through-hole 143.

Furthermore, the small diameter portion 141 has two insertion holes for inserting the output wires 153a and 153b.

The large diameter portion 142 forms a connection point with the heat sink 170, and is fitted in the heat sink 170. As FIG. 2 illustrates, the mounting 140 is fitted in the opening portion 170a of the heat sink 170 such that the outer circumferential surface of the large diameter portion 142 is in contact with the inner circumference surface of the heat sink 170. This allows heat to be efficiently conducted from the mounting 140 to the heat sink 170.

In addition, the top surface of the large diameter portion 142 is in contact with the opening portion 111 of the globe 110 so as to close the opening portion 111 of the globe 110. It should be noted that the mounting 140 and the heat sink 170 may be fixed using an adhesive such as a silicone resin, rather than by the pinching.

(Drive Circuit)

As FIG. 2 illustrates, the drive circuit (circuit unit) 150 is a light circuit (power supply circuit) for causing the LED module 120 (the LEDs 122) to emit light (be turned on), and supplies predetermined power to the LED module 120. For example, the drive circuit 150 converts alternating current (AC) power supplied from the base 190 via the pair of lead wires 153c and 153d into direct current (DC) power, and supplies the DC power to the LED module 120 via the pair of output wires 153a and 153b, which are lead wires.

The drive circuit 150 includes a circuit board 151 and a plurality of circuit elements (electronic components) 152 mounted on the circuit board 151.

The circuit board 151 is a printed circuit board on which metal lines are formed by patterning, and electrically connects the plurality of circuit elements 152 mounted on the circuit board 151. In Embodiment 1, the circuit board 151 is disposed in an orientation in which the main surface thereof crosses the lamp axis J at right angles.

Examples of the circuit elements 152 include a capacitative element such as an electrolytic capacitor or a ceramic capacitor, a resistance element, a rectifier circuit element, a coil element, a choke coil (choke transformer), a noise filter, a semiconductor element such as a diode or an integrated circuit element, and the like. Most of the circuit elements 152 are mounted on the main surface of the circuit board 151 on the base 190 side.

The drive circuit 150 formed in this way is housed in the circuit case 160. In Embodiment 1, the circuit board 151 is placed on projections (board holding portions) on the inner surface of a case body portion 161, and the main surface of the circuit board 151 is in contact with projections on a cap part 162. In this manner, the circuit board 151 is held in the circuit case 160. It should be noted that a light control circuit, a booster circuit, and the like may be suitably selected and combined as the drive circuit 150.

The drive circuit 150 and the LED module 120 are electrically connected by the pair of output wires 153a and 153b. Furthermore, the drive circuit 150 and the base 190 are electrically connected by the pair of lead wires 153c and 153d. The output wires 153a and 153b and the lead wires 153c and 153d are, for example, alloy copper lead wires, and each include a wire core made of alloy copper and an insulating resin coating which covers the wire core.

In Embodiment 1, the output wire 153a is a conducting wire (positive output terminal wire) for supplying a positive voltage from the drive circuit 150 to the LED module 120, whereas the output wire 153b (negative output terminal wire) is a conducting wire for supplying a negative voltage from the drive circuit 150 to the LED module 120. The output wires 153a and 153b pass through the insertion holes in the mounting 140, and are drawn out to the LED module 120 side (inside the globe 110).

It should be noted that the ends (wire cores) of the output wires 153a and 153b pass through the insertion holes in the board 121 of the LED module 120 and are electrically connected to the LEDs 122. The other ends (wire cores) of the output wires 153a and 153b are soldered to the metal lines of the circuit board 151.

Furthermore, the lead wires 153c and 153d are electric wires for supplying power for turning on the LED module 120, from the base 190 to the drive circuit 150. The lead wires 153c and 153d each have an end (wire core) electrically connected to the base 190 (a shell part 191 or an eyelet part 193), and another end (wire core) electrically connected to a power-input portion (metal line) of the circuit board 151 by soldering, for instance.

(Drive Circuit Detailed Circuit Configuration)

Figure 3:
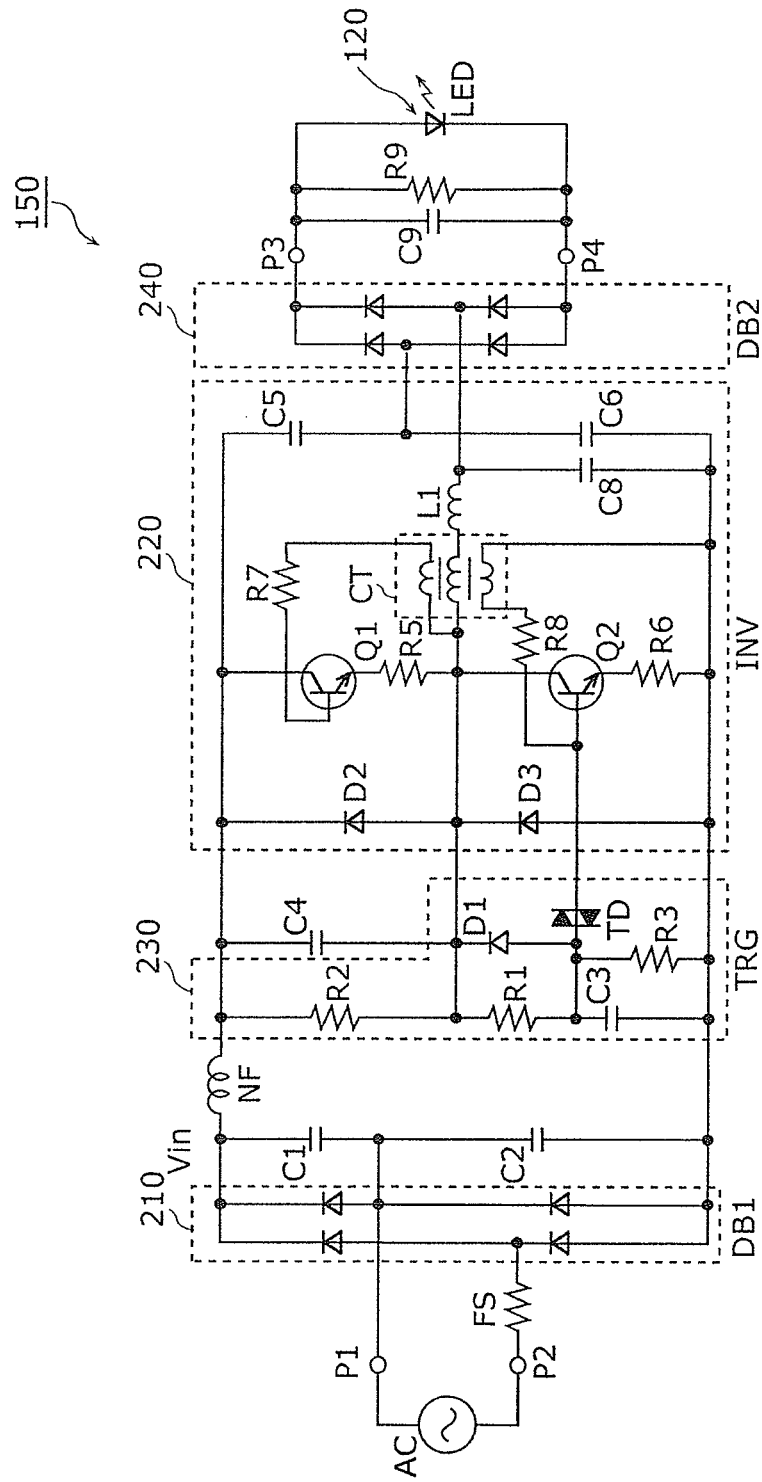
FIG. 3 is a circuit diagram of the drive circuit according to Embodiment 1.

Next, the circuit configuration of the drive circuit 150 will be described in detail with reference to FIG. 3. FIG. 3 is a circuit diagram of the drive circuit 150 according to Embodiment 1. It should be noted that an AC power source which supplies utility power to the drive circuit 150, and the LED module 120 which supplies DC power from the drive circuit 150 are also illustrated in FIG. 3.

As FIG. 3 illustrates, the drive circuit 150 according to Embodiment 1 is an LED drive circuit (LED lighting circuit) for turning on the LED module 120. The drive circuit 150 includes a first rectifier circuit 210, and inverter 220, an inverter control circuit 230, and a second rectifier circuit 240.

The drive circuit 150 has input terminals P1 and P2 for receiving the input AC voltage. The input terminals P1 and P2 are connected to an AC power source as well as the input terminals of the first rectifier circuit 210. For example, the input terminals P1 and P2 of the drive circuit 150 are connected to a utility AC power source via a wall switch. It should be noted that the utility AC power source refers to a 100 V utility AC power source, i.e. a household AC power source. Moreover, the input terminals P1 and P2 refer to, for example, the base 190 and such of the light bulb-shaped lamp 100, shown in FIG. 1A through FIG. 2, attached to a socket to which AC power is supplied.

The drive circuit 150 also has output terminals P3 and P4 for outputting the DC voltage. The output terminals P3 and P4 are connected to the LED module 120 as well as the output terminals of the second rectifier circuit 240. The high potential output terminal P3 is connected to an anode of the LED module 120, and the low potential output terminal P4 is connected to a cathode of the LED module 120. The DC voltage supplied from the drive circuit 150 turns the LED module 120 on. It should be noted that in Embodiment 1, a capacitor C9 and a resistor R9 are connected in parallel to the LED module 120.

Next, constituent elements of the drive circuit 150 according to Embodiment 1 will be described in detail.

First, the first rectifier circuit 210 will be described. The first rectifier circuit 210 (DB1) is a full-wave bridge rectifier circuit including diodes. The two terminals on the input side are connected to an AC power source via the input terminals P1 and P2, and the two terminals on the output side are connected to smoothing capacitors C1 and C2, for example. It should be noted that the smoothing capacitors C1 and C2 are provided to stabilize the output voltage from the first rectifier circuit 210, and are, for example, electrolytic capacitors. It should be noted that, here, an example is given in which the two smoothing capacitors C1 and C2 are used, but a single smoothing capacitor may be connected between the two output side terminals of the first rectifier circuit 210.

A current fuse element FS (15Ω) is inserted in series with a line connecting the AC power source and the first rectifier circuit 210. Additionally, a noise filter NF (1 mH) for canceling switching noise is inserted on a line connecting the negative voltage output terminal of the first rectifier circuit 210 and the inverter control circuit 230.

The first rectifier circuit 210, for example, receives AC voltage (for example, 50 Hz or 60 Hz) from a utility AC power source via a wall switch, and performs a full-wave rectification of the AC voltage and outputs DC voltage. The DC voltage output from the first rectifier circuit 210 is a DC input voltage Vin smoothed by the smoothing capacitors C1 and C2. The input voltage Vin is supplied to the inverter 220 and the inverter control circuit 230.

Next, the inverter 220 will be discussed. The inverter 220 (INV) outputs power for driving the LED module 120. In Embodiment 1, the inverter 220 converts DC voltage to AC voltage. For example, the inverter 220 converts DC voltage to AC voltage of several tens of kilohertz.

The inverter 220 includes a first switching element Q1, a second switching element Q2 connected in series to the first switching element Q1, a driver transformer CT, an inductor L1, capacitors C5, C6, and C8, resistors R5, R6, R7, and R8, and diodes D2 and D3.

In Embodiment 1, the inverter 220 is a self-commutated half-bridge inverter and has a series circuit consisting of the first switching element Q1 and the second switching element Q2 which alternately perform switching functions that is connected to a DC power source. Moreover, in Embodiment 1, the first switching element Q1 and the second switching element Q2 are bipolar transistors. It should be noted that in Embodiment 1, the self-commutated inverter refers to an inverter which uses a driver transformer and a plurality of switching elements to apply feedback.

The collector of the first switching element Q1 is connected to the positive DC voltage output terminal of the first rectifier circuit 210 and the capacitor C5. The emitter of the first switching element Q1 is connected, via the resistor R5, to the collector of the second switching element Q2 and the coil of the driver transformer CT. Moreover, the base of the first switching element Q1 is connected to the coil of the driver transformer CT via the transistor R7.

The collector of the second switching element Q2 is connected, via the resistor R5, to the emitter of the first switching element Q1 and the coil of the driver transformer CT. The emitter of the second switching element Q2 is connected, via the resistor R6, to the negative DC voltage output terminal of the first rectifier circuit 210, the coil of the driver transformer CT, and the capacitors C6 and C8. Moreover, the base of the second switching element Q2 is connected, via the transistor R8, to the coil of the driver transformer CT.

The driver transformer CT includes a wound coil configured of a primary winding (input winding) and a secondary winding (output winding).

The inductor L1 is a choke inductor, and one end is connected to the output side of the driver transformer CT while the other end is connected to the input side of the second rectifier circuit 240. Moreover, one end of the capacitor C5 is connected to the positive DC voltage output terminal of the first rectifier circuit 210 and the other end is connected to the input side of the second rectifier circuit 240. One end of the capacitor C6 is connected to the negative DC voltage output terminal of the first rectifier circuit 210 and the other end is connected to the input side of the second rectifier circuit 240. One end of the capacitor C8 is connected to the negative DC voltage output terminal of the first rectifier circuit 210 and the other end is connected to the other terminal of the inductor L1.

The cathode of the diode D2 is connected to the positive DC voltage output terminal of the first rectifier circuit 210 and the capacitor C5, and the anode is connected to the coil of the driver transformer CT and the emitter of the first switching element Q1 via the resistor R5. The cathode of the diode D3 is connected to the coil of the driver transformer CT, and the anode is connected to the negative DC voltage output terminal of the first rectifier circuit 210, the emitter of the second switching element Q2 via the resistor R6, the coil of the driver transformer CT, and the capacitors C6 and C8.

The inverter 220 configured in this manner operates by the predetermined input voltage Vin being applied between both terminals (the input terminals of the inverter 220) of the series circuit of the first switching element Q1 and the second switching element Q2 and an activation control signal (trigger signal) being supplied from the inverter control circuit 230. More specifically, the first switching element Q1 and the second switching element Q2 are turned on and off alternately by the auto-oscillation based on the induction by the driver transformer CT, and thus a secondary AC voltage is induced by the series resonance between the inductor L1 and the capacitor C8, and this voltage is supplied to the second rectifier circuit 240.

Next, the inverter control circuit 230 for driving the inverter 220 will be described. The inverter control circuit 230 (TRG) is configured to drive the inverter 220. In Embodiment 1, the inverter control circuit 230 activates and maintains the inverter 220. The inverter 220 activated by the inverter control circuit 230 keeps operating due to the elements configuring the driver transformer CT and the inverter 220. More specifically, the driver transformer CT, which is a magnetic saturation count transformer, magnetically saturates depending on whether the first switching element Q1 and the second switching element Q2 are on or off, which controls the first switching element Q1 and the second switching element Q2. As such, after the inverter 220 is activated by the inverter control circuit 230, it maintains that operation.

The inverter control circuit 230 includes resistors R1, R2, and R3, a capacitor C3 connected in series to the resistor R1, and a trigger diode TD connected to the connection point between the resistor R1 and the capacitor C3.

The resistor R1 is connected to the positive DC voltage output terminal of the first rectifier circuit 210 via the resistor R2 and connected to the negative DC voltage output terminal of the first rectifier circuit 210 via the capacitor C3. The capacitor C3 is a capacitor for controlling the conduction of the trigger diode TD, and the high potential side is connected to the transistor R1 while the low potential side is connected to the negative DC voltage output terminal of the first rectifier circuit 210. It should be noted that in the inverter control circuit 230, the resistor R1 and the capacitor C3 form a time constant circuit. The resistor R3 is connected in parallel to the capacitor C3. It should be noted that hereinafter, there are instances where the positive DC voltage output terminal of the first rectifier circuit 210 is referred to as the DC voltage output terminal on the high potential side of the first rectifier circuit 210 and the negative DC voltage output terminal of the first rectifier circuit 210 is referred to as the DC voltage output terminal on the low potential side of the first rectifier circuit 210.

The trigger diode TD is a trigger element that conducts current when a voltage exceeding a specified voltage (breakover voltage) is applied, discharges the electrical load of the capacitor C3 to the base of the switching element Q2, and turns on the short time switch Q2. In Embodiment 1, the trigger diode TD conducts current when the voltage stored in the capacitor C3 exceeds the breakover voltage. Then, the inverter 220 activates as a result of the trigger diode TD connected to the base of the second switching element Q2, which is the control terminal of the inverter 220, being in a conductive state.

In other words, current begins to flow into the inverter 220 only after the second switching element Q2 is turned on by the inverter control circuit 230. As a result of the load current flowing when the second switching element Q2 is turned on, the voltage in the secondary coil of the driver transformer CT is induced, whereby the second switching element Q2 is held in an on state and the first switching element Q1 is held in an off state.

When the second switching element Q2 is held in the on state, current reduced by the inductor L1 flows from the DC voltage output terminal on the high potential side of the first rectifier circuit 210 via the noise filter NC, the capacitor C5, the second rectifier circuit 240, the LED module 120, the inductor L1, the primary winding of the driver transformer CT, the second switching element Q2, and the resistor R6. This current causes the core of the driver transformer CT to magnetically saturate, and the output voltage of the secondary winding becomes zero. Consequently, the accumulated charge between base emitters of the second switching element Q2 is discharged. When the accumulated charge is completely drained, second switching element Q2 turns off.

When the second switching element Q2 turns off, the energy accumulated in the inductor L1 from the current that flowed from the inductor L1 is discharged to the capacitor C5 and the LED module 120 via the diode D2. This discharging of current cancels the magnetic saturation of the driver transformer CT and causes voltage that makes the base potential of the first switching element Q1 positive to be generated in the secondary winding on the first switching element Q1 side of the driver transformer CT while also causing voltage that makes the base of the second switching element Q2 negative to be generated in the secondary winding on the second switching element Q2 side of the driver transformer CT.

When the accumulated energy in the inductor L1 completely drains, the diode D2 current drains and the accumulated energy in the capacitors C5 and C6 is discharged via the first switching element Q1. Moreover, current flows from the DC voltage output terminal on the high potential side of the first rectifier circuit 210 to the DC voltage output terminal on the low potential side of the first rectifier circuit 210 via the noise filter NF, the first switching element Q1, the driver transformer CT, the inductor L1, the capacitor C8, the LED module 120 and the capacitor C6.

This current causes energy to accumulate in the inductor L1 and the capacitor C8, and causes voltage to generate in the secondary winding of the driver transformer CT which holds the first switching element Q1 in an on state and holds the second switching element Q2 in an off state.

Then, when the driver transformer CT becomes magnetically saturated, the accumulated electrical load in the first switching element Q1 is discharged. When the discharging is complete, the first switching element Q1 is turned on. The accumulated energy in the inductor L1 at the instant the first switching element Q1 is turned off is discharged via the driver transformer CT, the diode D3, the capacitor C8, and the LED module 120, and capacitors C6 and C5. Also, the magnetic saturation of the driver transformer CT is cancelled and voltage is generated which makes the base of the second switching element Q2 positive and the base of the first switching element Q1 negative. Then, after the accumulated energy in the inductor L1 is drained, as described above, the first switching element Q1 and the second switching element Q2 alternately turn on and off, and series resonance is generated between the inductor L1 and the capacitor C8, whereby normal operation is achieved which maintains oscillation.

It should be noted that a DIAC having a 28 V to 36 V breakover voltage, for example, can be used as the trigger diode TD.

As described above, the inverter control circuit 230 is a circuit for activating the inverter 220 and includes a circuit which adjusts voltage at both terminals of the capacitor C3 due to the voltage dividing proportions of the resistors R1, R2, and R3, and the trigger diode TD in which the voltage value of the capacitor C3 exceeds the breakover voltage. Upon receiving the trigger signal from the inverter control circuit 230, the inverter 220 begins to auto-oscillate.

Moreover, in Embodiment 1, the inverter control circuit 230 includes the resistor R2 connected in series to the resistor R1, and the diode D1 connected in parallel to the resistor R1. The diode D1 is a rectifier diode. An anode of the diode D1 is connected to the connection point between the resistor R1 and the capacitor C3, and to the trigger diode TD. A cathode of the diode D1 is connected to the connection point between the resistor R1 and the resistor R2, the connection point between the first switching element Q1 (the emitter) and the second switching element Q2 (the collector) in the inverter 220, and the capacitor C4. It should be noted that the high potential side of the capacitor C4 is connected to the positive DC voltage output terminal of the first rectifier circuit 210 and the collector of the first switching element Q1, and the low potential side of the capacitor C4 is connected to the cathode of the diode D1. The capacitor C4 is a snubber capacitor, and is used optionally for reducing the speed of voltage change of the switching elements Q1 and Q1 and to reduce switching loss.

Next, the second rectifier circuit 240 will be described. Similar to the first rectifier circuit 210, the second rectifier circuit 240 (DB2) is a full-wave bridge rectifier circuit including four diodes. The two terminals on the input side are connected to the two terminals on the output side of the inverter 220, and regarding the two terminals on the output side, the high potential side is connected to the anode of the LED module 120 via the output terminal P3, and the low potential side is connected to the cathode of the LED module 120 via the output terminal P4.

The second rectifier circuit 240 receives AC voltage from the inverter 220 and outputs and supplies full-wave rectified voltage of the received AC voltage to the LED module 120.

It should be noted that the second rectifier circuit 240 can be configured of two semiconductor components each including two Schottky diodes connected in series. Moreover, the second rectifier circuit 240 may be a stack circuit provided at each output of the inverter when the inverter is divided into two secondary windings.

The drive circuit 150 according to Embodiment 1 is configured in this manner.

Next, operation of the drive circuit 150 configured as described above will be described.

For example, when a user turns a wall switch on to turn on the LED module 120, AC power is supplied to the input terminals P1 and P2, and DC input voltage Vin smoothed by the first rectifier circuit 210 is generated. The input voltage Vin is supplied between the input terminals of the inverter 220 and between the input terminals of the inverter control circuit 230.

This activates the inverter control circuit 230 and the inverter 220. In other words, the supply of the input voltage Vin to the inverter control circuit 230 charges the capacitor C3 in the inverter control circuit 230 whereby the trigger diode TD reaches its breakover voltage. This puts the trigger diode TD in a conductive state whereby a trigger signal (trigger pulse) is supplied to the base of the second switching element Q2 of the inverter 220, turning on the second switching element Q2.

The inverter 220 activates when the second switching element Q2 is turned on by the trigger signal. Then, the first switching element Q1 and the second switching element Q2 turn on and off alternately from the auto-oscillation based on the induction of the driver transformer CT, which induces the AC secondary voltage. In this manner, the AC voltage generated by enhancing the secondary AC voltage by the series resonance between the inductor L1 and the capacitor C8 is supplied to the second rectifier circuit 240. The AC voltage is then full-wave rectified by the second rectifier circuit 240 and a predetermined DC voltage (forward voltage VF) is supplied to the LED module 120 via the output terminals P3 and P4. This causes the LED module 120 to turn on and light up to a predetermined brightness.

Next, when a user turns the wall switch off to turn off the LED module 120, the supply of AC power to the input terminals P1 and P2 is interrupted and the LED module 120 turns off.

As described above, the drive circuit 150 converts AC power supplied to the input terminals P1 and P2 of the light bulb-shaped lamp 100 into predetermined DC power, and supplies the converted DC power from the output terminals P3 and P4 to the LED module 120 (LEDs 122). In other words, the drive circuit 150 converts AC power supplied from the base 190 via the pair of lead wires 153c and 153d connected to the pair of input terminals P1 and P2 into DC power, and supplies the converted DC power to the LED module 120 via the pair of output wires 153a and 153b connected to the pair of output terminals P3 and P4.

(Potential-Stabilizing Wire)

The potential-stabilizing wire 154 is one example of the reference potential wire, and electrically connects, to the reference potential of the drive circuit 150, (i) the pedestal 145 supporting the board 121 (module board) of the LED module 120 and (ii) the heat sink 170 surrounding the drive circuit 150. More specifically, one end of the potential-stabilizing wire 154 is connected to a ground potential, which is one example of the reference potential on the drive circuit 150, and the other end is connected to the pedestal 145 and the heat sink 170. It should be noted that hereinafter, the ground potential on the drive circuit 150 (for example, the negative DC voltage output terminal of the first rectifier circuit 210) is also referred to as the ground potential of the drive circuit, and also referred to as the circuit ground.

Here, "electrically connected" is not limited to two terminals (nodes) being directly connected, but also includes two terminals (nodes) connected together via some element and thus achieving the same functionality as being directly connected.

The potential-stabilizing wire 154 is, for example, an alloy copper lead wire, and is configured of an alloy copper wire core and an insulating resin coating covering the wire core.

One end of the potential-stabilizing wire 154 (the wire core) is soldered to the metal ground line on the circuit board 151. In other words, one end of the potential-stabilizing wire 154 is connected to the circuit ground on the drive circuit 150. The other end of the potential-stabilizing wire 154 (the wire core) is inserted through the insertion hole provided in the circuit case 160 at a location facing the mounting 140 and is drawn into the gap between the circuit case 160 and the mounting 140. The potential-stabilizing wire 154 drawn from the circuit case 160 extends through the gap between the circuit case 160 and the mounting 140 to the edge of the mounting 140. At the edge of the mounting 140, the potential-stabilizing wire 154 is bent toward the globe 110 and pinched between the mounting 140 and the opening portion 170a of the heat sink 170.

Here, as FIG. 2 shows, the wire core of the potential-stabilizing wire 154 is covered by the resin coating in the circuit case 160, and bare outside of the circuit case 160. In other words, the portion of the potential-stabilizing wire 154 drawn outside of the circuit case 160 is electrically connected to the mounting 140. That is to say, it is electrically connected to the pedestal 145. Moreover, at the edge of the mounting 140, the portion of potential-stabilizing wire 154 drawn out from the circuit case 160 is pinched between the mounting 140 and the opening portion 170a of the heat sink 170. In other words, the potential-stabilizing wire 154 is also electrically connected to the heat sink 170.

As described above, since one end of the potential-stabilizing wire 154 is connected to the circuit ground on the drive circuit 150 and the other end of the potential-stabilizing wire 154 is pinched between the mounting 140 and the heat sink 170, the mounting 140 and the heat sink 170 are electrically connected to the circuit ground on the drive circuit 150.

Thus, the potential-stabilizing wire 154 electrically connects (i) the pedestal 145, which includes the mounting 140 and the support 130 and supports the board 121 (module board) on which the LEDs 122 are mounted, and (ii) the circuit ground (reference potential) on the drive circuit 150.

It should be noted that in Embodiment 1, the pedestal 145 is one example of the metal component.

(Circuit Case)

As FIG. 2 illustrates, the circuit case 160 is an insulating case for housing the drive circuit 150, and formed so as to surround the drive circuit 150. The circuit case 160 is housed in the heat sink 170 and the base 190. In Embodiment 1, the circuit case 160 includes the case body portion 161 and the cap part 162.

The case body portion 161 is an insulating case (housing) having openings on both sides. Projections (board holding portions) are provided for positioning the circuit board 151 at two or more positions (for example, three positions) on the inner surface of the case body portion 161. An example of the material used for the case body portion 161 is an insulating resin material, such as poly butylene terephthalate (PBT).

In Embodiment 1, the case body portion 161 includes a first case portion 161a having a large-diameter cylindrical shape that is substantially the same as the shape of the heat sink 170, and a second case portion 161b connected to the first case portion 161a and having a small-diameter cylindrical shape that is substantially the same as the shape of the base 190.

The first case portion 161a positioned on the globe 110 side is housed in the heat sink 170. Most of the drive circuit 150 is covered by the first case portion 161a.

The second case portion 161b positioned on the base 190 side is housed in the base 190, and the base 190 is fitted onto the second case portion 161b. This closes the opening of the circuit case 160 (the case body portion 161) on the base 190 side.

In Embodiment 1, a screwing portion for screwing into the base 190 is formed on the outer circumferential surface of the second case portion 161b, and the base 190 is fixed onto the circuit case 160 (the case body portion 161) by screwing onto the second case portion 161b.

The cap part 162 is a cap-shaped substantially cylindrical component having a closed end and insulating properties.

Similar to the case body portion 161, an example of the material used for the cap part 162 is an insulating resin material such as PBT.

It should be noted that in Embodiment 1, although the circuit case 160 includes the cap part 162, the circuit case 160 may include only the case body portion 161, without including the cap part 162.

(Heat Sink)

The heat sink 170 is a heat dissipation component, and is connected to the mounting 140. This allows heat generated by the LED module 120 to be conducted to the heat sink 170 via the support 130 and the mounting 140. Consequently, heat generated by the LED module 120 can be dissipated.

In Embodiment 1, the heat sink 170 is formed so as to surround the drive circuit 150. Thus, the drive circuit 150 is disposed inside the heat sink 170. The drive circuit 150 is surrounded by the circuit case 160, and thus the heat sink 170 is formed so as to surround the circuit case 160. This allows the heat sink 170 to also dissipate heat generated by the drive circuit 150.

Furthermore, in Embodiment 1, the heat sink 170 extends up to the boundary portion between the first case portion 161a and the second case portion 161b of the circuit case 160.

The heat sink 170 is preferably formed using a material having high thermal conductivity, and can be formed using a metal component, for example. The heat sink 170 according to Embodiment 1 is molded using aluminum. It should be noted that the heat sink 170 may be formed using non-metal material such as resin, rather than metal. In this case, it is preferable to use a non-metal material having high thermal conductivity for the heat sink 170.

In Embodiment 1, the heat sink 170 is formed so as to be fitted onto the mounting 140, and the inner circumferential surface of the heat sink 170 and the outer circumferential surface of the mounting 140 are in contact with each other in the entire circumferential direction.

(Outer Case)

As FIG. 2 illustrates, the outer case 180 is formed so as to circumferentially surround the heat sink 170. The external surface of the outer case 180 is exposed outside the lamp (in the air). The outer case 180 is an insulating cover having insulating properties, formed using insulating material. The insulating properties of the light bulb-shaped lamp 100 can be improved by covering the metal heat sink 170 with the insulating outer case 180. An example of the material of the outer case 180 is an insulating resin material such as PBT.

The outer case 180 is a substantially cylindrical component having a constant thickness and gradually changing inside and outside diameters, and can be formed in a flared shape such that the inner and external surfaces are truncated cone shaped, for example. In Embodiment 1, the outer case 180 is formed such that the inside diameter and the outside diameter gradually decrease toward the base 190.

(Base)

The base 190 is a receiving part which receives power from outside the lamp for causing the LED module 120 (the LEDs 122) to emit light. The base 190 is attached to a socket of a lighting fixture, for example. In this manner, the base 190 can receive power from a socket of the lighting fixture when the light bulb-shaped lamp 100 is turned on.

AC power is supplied to the base 190 from an AC 100 V utility power source, for example. The base 190 according to Embodiment 1 receives AC power at two contacts, and the power received by the base 190 is input to the power-input portion of the drive circuit 150 via the pair of lead wires 153c and 153b.

The base 190 is a metal cylinder having a closed end, and includes the shell part 191 having an outer circumferential surface forming a male screw and the eyelet part 193 attached to the shell part 191 via an insulating part 192. The external circumferential surface of the base 190 has a screwing portion for screwing into the socket of the lighting fixture. The inner circumferential surface of the base 190 has a screwing portion for screwing onto the screwing portion of the case body portion 161 of the circuit case 160 (the second case portion 161b).

Although the type of the base 190 used is not particularly limited, an Edison (E) screw base is used in Embodiment 1. Examples of the base 190 include E26, E17, and E16 bases, for instance.

(Light Bulb-Shaped Lamp Distinguishing Structure)

The following describes a distinguishing structure of the light bulb-shaped lamp 100 according to Embodiment 1, and different variations, with reference to FIG. 4 through FIG. 9.

Figure 4:
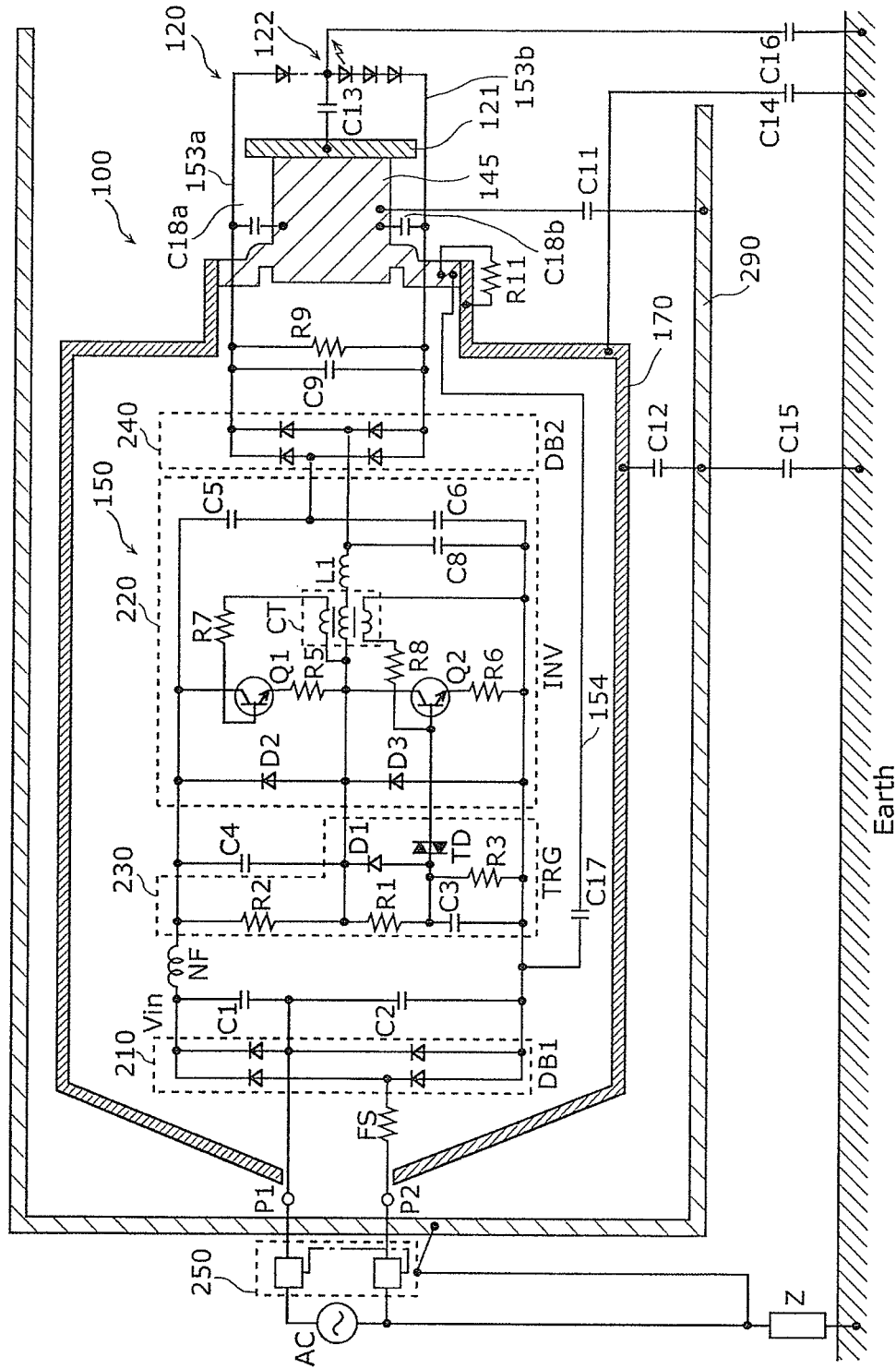
FIG. 4 illustrates a structural feature of the light bulb-shaped lamp according to Embodiment 1.

FIG. 4 is for illustrating a distinguishing structure of the light bulb-shaped lamp 100 according to Embodiment 1, and schematically illustrates the structure of the light bulb-shaped lamp 100 and the electrostatic capacitance generated in the light bulb-shaped lamp 100. It should be noted FIG. 4 also depicts an equivalent power source circuit network 250 schematically illustrated as an equivalent circuit of a power source circuit network connected to the light bulb-shaped lamp 100, a ground impedance Z of the equivalent power source circuit network 250, and a cover 290 of the light fixture to which the light bulb-shaped lamp 100 is attached. The equivalent power source circuit network 250 is a pseudo-electric power source circuit network and the cover 290 is a truncated cone shaped metal housing, and both adhere to CISPR standards.

As FIG. 4 illustrates, electrostatic capacitance C11 through C16 and parasitic resistance R11 occur in the light bulb-shaped lamp 100, the cover 290 of the light fixture to which the light bulb-shaped lamp 100 is attached, and the constituent components of the light bulb-shaped lamp 100. More specifically, electrostatic capacitance C11 occurs between the pedestal 145 and the cover 290, electrostatic capacitance C12 occurs between the heat sink 170 and the cover 290, electrostatic capacitance C13 occurs between the pedestal 145 and the LED module 120, electrostatic capacitance C14 occurs between the heat sink 170 and earth, electrostatic capacitance C15 occurs between the cover 290 and earth, electrostatic capacitance C16 occurs between the LED module 120 and earth, and parasitic resistance R11 occurs between the pedestal 145 and the heat sink 170.

In Embodiment 1, as previously described, the potential-stabilizing wire 154 is pinched between the pedestal 145 and the circuit case 160. The potential-stabilizing wire 154 is also pinched between the pedestal 145 and the heat sink 170. As such, as FIG. 4 illustrates, the pedestal 145 is electrically connected to the circuit ground of the drive circuit 150.

Next, the noise generated in the pedestal 145 will be discussed while explaining the operation of the above-described drive circuit 150.

As previously described, in the inverter 220 of the drive circuit 150, the AC secondary voltage becomes inductive as a result of the first switching element Q1 and the second switching element Q2 turning on and off alternately. At this time, the first switching element Q1 and the second switching element Q2 perform the switching operations at roughly 50 kHz. As such, the frequency of the current supplied from the inverter 220 to the second rectifier circuit 240 is 50 kHz, and the total ground to ground potential change of the LED module 120 is also 50 kHz.

In the second rectifier circuit 240, the four diodes forming the diode bridge switch at 50 kHz current supplied from the inverter 220. As a result, in the second rectifier circuit 240, noise at a frequency of, for example, 300 kHz to 700 kHz is generated.

Consequently, the predetermined DC voltage supplied from the drive circuit 150 to the LED module 120 is superimposed with noise having a frequency of 300 kHz to 700 kHz. In other words, voltage superimposed with noise at 300 kHz to 700 kHz modulated at 50 kHz is supplied to the output wires 153a and 153b for supplying DC voltage from the drive circuit 150 to the LED module 120.

Here, the output wire 153a and the output wire 153b are electrostatically coupled with the surrounding elements. More specifically, the output wire 153a is electrostatically coupled with the pedestal 145, which is a metal component in the vicinity of the output wire 153a, via electrostatic capacitance C18a. Similarly, the output wire 153b is electrostatically coupled with the pedestal 145, which is a metal component in the vicinity of the output wire 153b, via electrostatic capacitance C18b.

As a result, noise generated in the output wires 153a and 153b becomes common mode noise, and propagates to the pedestal 145 via electrostatic capacitance C18a and electrostatic capacitance C18b. The noise propagated to the pedestal 145 further propagates to the cover 290 via electrostatic capacitance C11 between the pedestal 145 and the cover 290. The noise propagated to the pedestal 145 further propagates to the heat sink 170 via parasitic resistance R111 and propagates to the cover 290 from the heat sink 170 via electrostatic capacitance C12. The noise propagated to the heat sink 170 also propagates to the earth via electrostatic capacitance C14. The noise propagated to the cover 290 from the pedestal 145 and the heat sink 170 further propagates to the earth via electrostatic capacitance C15.

Moreover, since the DC voltage supplied from the LED module 120 is superimposed with noise, noise is also generated from the LEDs 122. The noise generated from the LEDs 122 propagates to the board 121 via electrostatic capacitance C13. The noise generated in the board 121 also propagates to the earth via electrostatic capacitance C16.

This complicated noise which propagates to the earth in this manner, and in particular the noise in a relatively low frequency band that propagates via electrostatic couplings, cannot easily be canceled by general normal mode noise filters or simple common mode filters, and propagate to the earth and to the equivalent power source circuit network 250. The noise propagated to the equivalent power source circuit network 250 further propagates to the light bulb-shaped lamp 100 and to other devices connected to the equivalent power source circuit network 250, having an adverse effect.

For the purpose of reducing this noise, the light bulb-shaped lamp 100 according to Embodiment 1 includes the potential-stabilizing wire 154 which electrically connects the ground potential of the drive circuit 150 to the pedestal 145.

With this, the potential of the pedestal 145 can be made to be equal to the ground potential of the drive circuit 150. In other words, the potential of the pedestal 145 becomes the ground potential of the drive circuit 150 and is not effected by the noise from the output wire 153a and the 153b. That is to say, the noise generated in the pedestal 145 is fed back to the drive circuit 150 via the potential-stabilizing wire 154. This makes it possible to greatly reduce the noise propagated to the earth from the pedestal 145 via other components (i.e. the heat sink 170 and the cover 290).

It should be noted that other than the noise from the output wires 153a and 153b, noise generated in the light bulb-shaped lamp 100 can be noise generated in the drive circuit 150 itself. The noise generated in the drive circuit 150 is, for example, noise having a frequency of, for example, 50 kHz that is generated by the switching operations performed by the first switching element Q1 and the second switching element Q2, for example, or noise having a frequency of, for example, 300 kHz to 700 kHz that is generated by the diodes D2 and D3.

For the purpose of reducing this noise, in the light bulb-shaped lamp 100 according to Embodiment 1, the heat sink 170 surrounding the drive circuit 150 is electrically connected to the ground potential of the drive circuit 150 via the potential-stabilizing wire 154. More specifically, the heat sink 170 is connected to the ground potential of the drive circuit 150 via the potential-stabilizing wire 154 and the capacitor C17.

With this, the potential of the heat sink 170 can be made to be equal to the ground potential of the drive circuit 150. In other words, the potential of the heat sink 170 becomes the ground potential of the drive circuit 150 and is not effected by the noise generated by the drive circuit 150—in other words, the noise radiating from the drive circuit 150. That is to say, the noise propagated to the heat sink 170 via electrostatic capacitance between the drive circuit 150 and the heat sink 170 (not shown in the drawings) is fed back to the drive circuit 150 via the potential-stabilizing wire 154. This makes it possible to keep the noise generated in the drive circuit 150 and propagated to the heat sink 170 from the drive circuit 150 itself from further propagating to the earth directly or via the cover 290, for example.

Moreover, in Embodiment 1, the pedestal 145 and the heat sink 170 are connected to the circuit ground of the drive circuit 150 via the capacitor C17 connected to the potential-stabilizing wire 154 in series. This insulates the heat sink 170 and the circuit ground of the drive circuit 150. As such, even if the light bulb-shaped lamp 100 does not include the outer case 180, when the light bulb-shaped lamp 100 is turned on, the chance of a person being shocked when touching the heat sink 170 is reduced.

More specifically, when 50 Hz, 100 V AC power is supplied from an AC power source, the voltage at the circuit ground of the drive circuit 150 according to Embodiment 1 shown in FIG. 3 and FIG. 4 is, for example, as follows. The voltage of the circuit ground of the drive circuit 150—that is to say, the voltage at the negative DC voltage output terminal of the first rectifier circuit 210—is 100 V, 50 Hz in phase with the supplied AC power, and has a square wave offset voltage of 100 V. In other words, the voltage of the circuit ground of the drive circuit 150 is any value between 0 V and 200 V. As a result, when the capacitor C17 is not provided, the voltage of the heat sink 170, similar to the voltage of the circuit ground of the drive circuit 150, can assume any value between 0 V and 200 V. As such, if the light bulb-shaped lamp 100 does not include the outer case 180 and does not include the capacitor C17, there is a chance of a person being shocked when touching the heat sink 170.

In contrast, since the light bulb-shaped lamp 100 according to Embodiment 1 includes the capacitor C17, which is connected in series with the potential-stabilizing wire 154 (the reference potential wire) between the circuit ground (reference potential) of the drive circuit 150 and the heat sink 170, the circuit ground and the heat sink 170 are insulated. As such, even if the light bulb-shaped lamp 100 does not include the outer case 180, it is possible to prevent a person from being shocked when touching the heat sink 170 is reduced. The capacitor C17 is, for example, a ceramic capacitor having a capacity of 220 pF. It should be noted that the capacitance of the capacitor C17 is not limited to this example. For example, the capacitance may be 2200 pF. Generally speaking, a capacitor having a capacitance that is about the same as capacitors used as Y capacitors is acceptable.

Next, the noise generated in the light bulb-shaped lamp 100 according to Embodiment 1 will be explained by comparing it with noise generated in the light bulb-shaped lamp according to a comparative example. It should be noted that here, the comparative example is the light bulb-shaped lamp 100 without the potential-stabilizing wire 154 and the capacitor C17.

Figure 5:
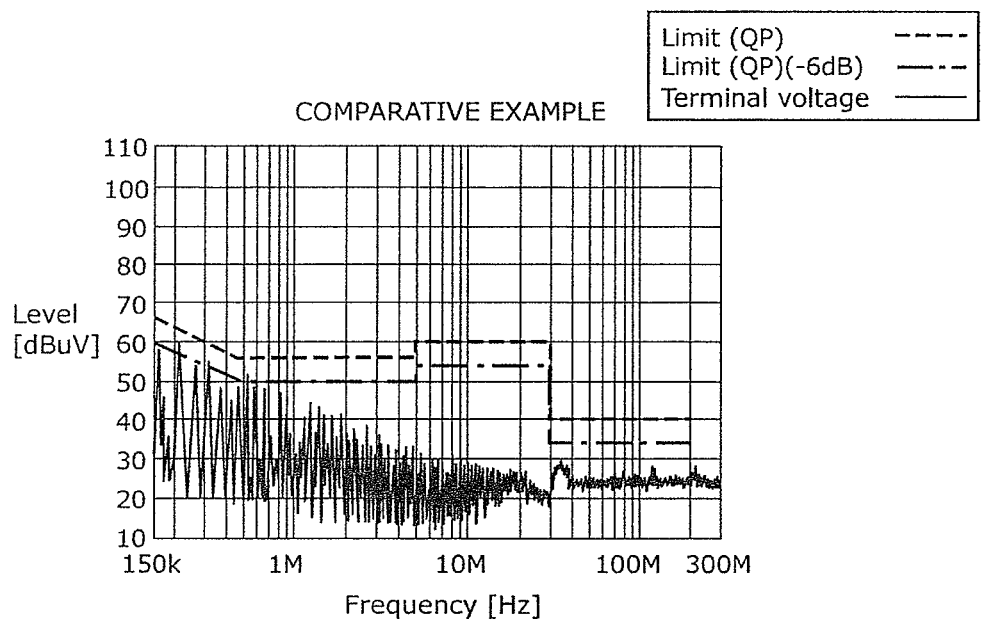
FIG. 5 is a graph illustrating the noise generated in the light bulb-shaped lamp according to the comparative example.
Figure 6:
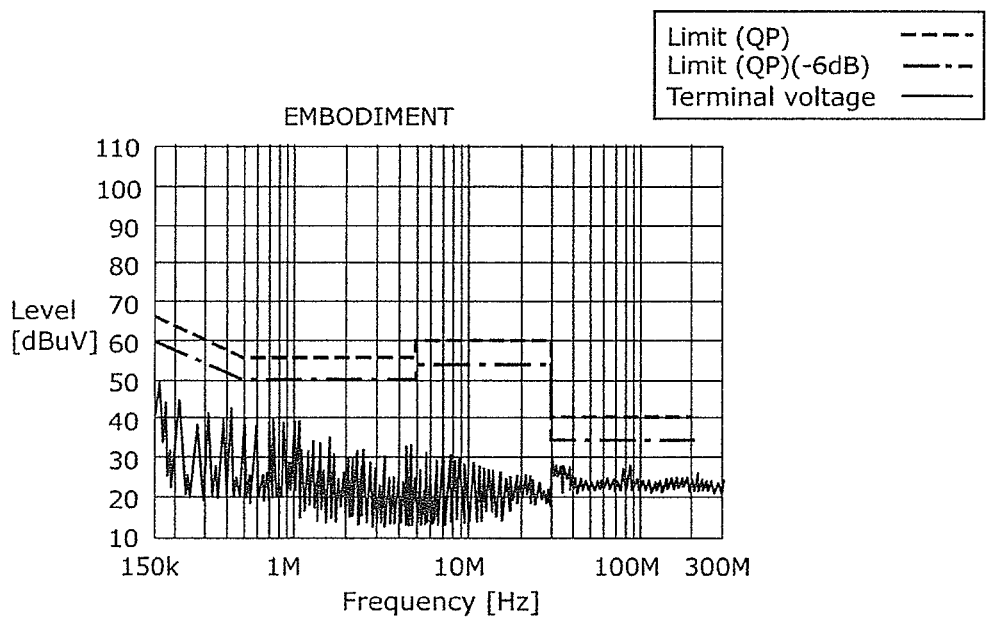
FIG. 6 is a graph illustrating the noise generated in the light bulb-shaped lamp according to Embodiment 1.

FIG. 5 is a graph illustrating noise in the light bulb-shaped lamp according to the comparative example. More specifically, FIG. 5 is a graph illustrating terminal voltage noise when the light bulb-shaped lamp according to the comparative example is connected to the equivalent power source circuit network 250 and the cover 290 (for example, a pseudo-electric power source circuit network and a truncated cone shaped metal housing which adhere to CISPR standards), as FIG. 4 illustrates. Frequency is represented on the horizontal axis, and noise level is represented on the vertical axis. FIG. 6 is a graph illustrating the noise in the light bulb-shaped lamp 100 according to Embodiment 1. More specifically, FIG. 6 is a graph illustrating terminal voltage noise when the light bulb-shaped lamp 100 according to Embodiment 1 is connected to the equivalent power source circuit network 250 and the cover 290, as FIG. 4 illustrates.

It should be noted that only the terminal voltage noise for one of the two input terminals is shown in both FIG. 5 and FIG. 6, but the terminal voltage noise is the same for the other input terminal. Levels Limit (QP) and Limit (QP) (−6 db) permissible under, for example, CISPR standards, are shown in FIG. 5 and FIG. 6. Limit (QP) is a value permissible in quasi-peak value mode, and Limit (QP) (−6 db) is a value permissible in average value mode.

As FIG. 5 illustrates, the terminal voltage noise level of the light bulb-shaped lamp according to the comparative example is less than the permissible level Limit (QP), but there are instances when it exceeds Limit (QP) (−6 db). There is a 3.9 dB margin until the permissible level Limit (QP). Moreover, this comparative example is a best-case scenario in which various types of common mode filters and normal mode filters have been added and noise propagation paths for the components have been blocked—that is to say, in which the noise level has been suppressed. As such, there is concern that the terminal voltage noise level will exceed the permissible level Limit (QP) when the resistance value and capacitance value, for example, change due to degradation over time or thermal expansion of the components in the light bulb-shaped lamp, for example.

In contrast, the terminal voltage of the light bulb-shaped lamp 100 according to Embodiment 1 is below both permissible levels Limit (QP) and Limit (QP) (−6 dB), as FIG. 6 shows. More specifically, there is a 13.8 dB margin until the permissible level Limit (QP). As such, compared to the light bulb-shaped lamp according to the comparative example, the light bulb-shaped lamp light 100 according to Embodiment 1 is capable of securing a sufficient margin with respect to the permissible level Limit (QP). As such, there is little concern that the terminal voltage noise level will exceed the permissible level Limit (QP) even when the resistance value and capacitance value, for example, change due to degradation over time or thermal expansion of the components in the light bulb-shaped lamp 100, for example.

In this way, compared to the light bulb-shaped lamp according to the comparative example, provision of the potential-stabilizing wire 154 and the capacitor C17 allows the light bulb-shaped lamp 100 according to Embodiment 1 to achieve a reduction in terminal voltage noise level.

It should be noted that the terminal voltage noise level is barely affected by the capacitor C17. In other words, even if the capacitance value of the capacitor C17 is increased or made zero, the terminal voltage noise value remains unchanged for the most part. That is to say, even if the light bulb-shaped lamp 100 according to Embodiment 1 does not include the capacitor C17, it is still possible to achieve a reduction in terminal voltage noise level.

As described above, the light bulb-shaped lamp 100 according to Embodiment 1 includes: the board 121 on which the LEDs 122 are mounted; the circuit board 151 on which the circuit element 152 of the drive circuit 150 that turns on the LEDs 122 is mounted; the output wires 153a and 153b for supplying power for turning on the LEDs 122 from the drive circuit 150 to the LEDs 122; the pedestal 145; and the potential-stabilizing wire 154 (reference potential wire) electrically connecting the pedestal 145 to the circuit ground (reference potential) of the drive circuit 150.

By electrically connecting the pedestal 145 to the circuit ground of the drive circuit 150 via the potential-stabilizing wire 154, the potential of the pedestal 145 can be made to be equal to the ground potential of the drive circuit 150. In other words, the potential of the pedestal 145 becomes the ground potential of the drive circuit 150 and is not effected by the noise from the output wire 153a and the 153b. That is to say, the noise generated in the pedestal 145 is fed back to the drive circuit 150 via the potential-stabilizing wire 154. This makes it possible to greatly reduce the noise propagating to the earth from the pedestal 145 through other components (i.e. the heat sink 170 and the cover 290), and thus reduce the terminal voltage noise level of the light bulb-shaped lamp 100. In other words, it is possible to reduce the noise generating from the light bulb-shaped lamp 100.

Moreover, the light bulb-shaped lamp 100 according to Embodiment 1 is capable of reducing noise without the use of large or special noise suppression circuits and components. Generally, large or special noise suppression circuits and components such as noise filters, beads, snubber circuits, etc. are used as noise suppression measures. However, with the design of the drive circuit 150 according to Embodiment 1 in which the inverter 220 is used to turn on the LED module 120, since fluctuation in the electrical field in the output wires 153a and 153b for supplying power from the inverter 220 to the LED module 120 is large, it is difficult to reduce noise even if the above-described large or special noise suppression circuits and components are used.

This is due to the fluctuation in the electrical field of the output wires 153a and 153b—that is to say, the noise from the output wires 153a and 153b—propagating to the large or special noise suppression circuits and components as a result of the electrostatic capacitance generated between the output wires 153a and 153b and the large or special noise suppression circuits and components.

A configuration in which a chopper circuit for suppressing fluctuation of the electrical field in the output wires 153a 153b, for example, is used instead of the inverter 220 is conceivable, but even with this kind of configuration, provision of large or special noise suppression circuits and components is problematic since the size and cost of the light bulb-shaped lamp increases.

In contrast, since the light bulb-shaped lamp 100 according to Embodiment 1 is capable of reducing noise without the use of large or special noise suppression circuits and components, the light bulb-shaped lamp 100 according to Embodiment 1 can be small in size and low-cost.

It should be noted that in Embodiment 1, the potential-stabilizing wire 154 may be stranded wire. More specifically, the core of the potential-stabilizing wire 154 may be stranded wire. With this, compared to when the potential-stabilizing wire 154 (the wire core) is a single wire, the contact surface area of the potential-stabilizing wire 154 (the wire core) and the pedestal 145 can be increased and noise can be further reduced.

Variation 1 of Embodiment 1

Figure 7:
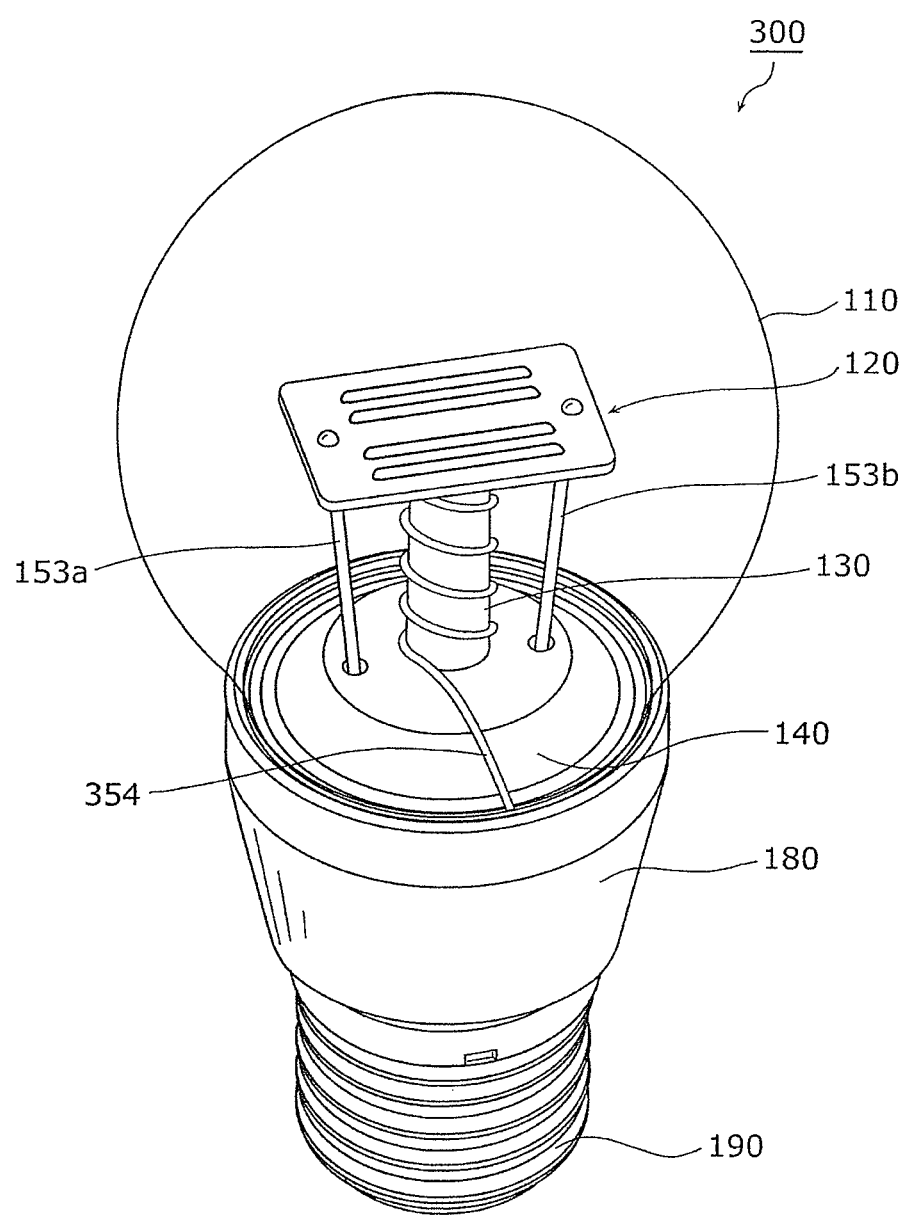
FIG. 7 is an external perspective view of the light bulb-shaped lamp according to Variation 1 of Embodiment 1.

Next, Variation 1 of Embodiment 1 will be described with reference to FIG. 7. FIG. 7 is an external perspective view of the light bulb-shaped lamp according to Variation 1 of Embodiment 1.

As is illustrated in FIG. 7, a potential-stabilizing wire 354 may be wound around the support 130. Similar to the above-described light bulb-shaped lamp 100, a light bulb-shaped lamp 300 in which the potential-stabilizing wire 354 is wound around the support 130 is capable of suppressing noise.

More specifically, when the potential-stabilizing wire 354 is configured of an alloy copper wire core and an insulating resin coating covering the wire core, the potential-stabilizing wire 354 wire core and the support 130 are electrostatically coupled by the electrostatic capacitance generated therebetween. In other words, winding the potential-stabilizing wire 354 around the support 130 shields the support 130 from fluctuations in the electrical field generated by the output wires 153a and 153b.

As such, similar to the light bulb-shaped lamp 100 according to Embodiment 1, the light bulb-shaped lamp 300 according to Variation 1 of Embodiment 1 is capable of reducing noise. Upon measuring the terminal voltage noise of the light bulb-shaped lamp 300, the inventors found that winding the potential-stabilizing wire 354 around the support 130 eight times achieves a margin of roughly 7 db from the permissible level Limit (QP).

Variation 2 of Embodiment 1

Figure 8:
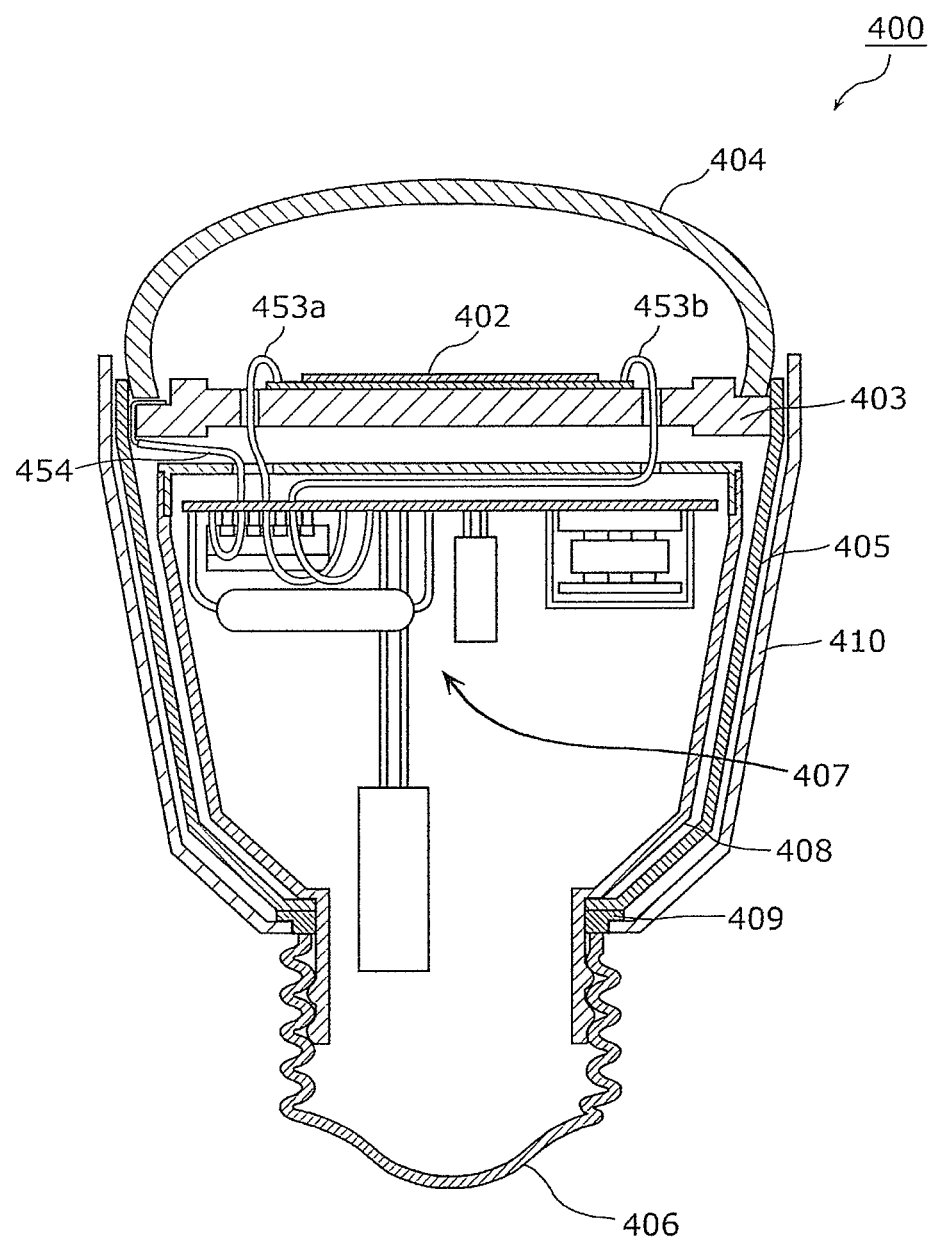
FIG. 8 is a cross section of the light bulb-shaped lamp according to Variation 2 of Embodiment 1.

Next, Variation 2 of Embodiment 1 will be described with reference to FIG. 8. FIG. 8 is a cross section of the light bulb-shaped lamp 400 according to Variation 2 of Embodiment 1.

As is illustrated in FIG. 8, the light bulb-shaped lamp 400 according to Variation 2 of Embodiment 1 includes an LED module 402 provided with a plurality of LED chips, an LED module attachment component 403, a globe 404, a heat sink 405, a base 406, a drive circuit 407, a resin case 408, an insulation ring 409, an outer case 410, and a potential-stabilizing wire 454.

The LED module 402 radiates illuminating light of a pre-determined color.

The LED module attachment component 403 (the pedestal) is a pedestal which supports the LED module 402. More specifically, the LED module attachment component 403 is a holder (module plate) made from a metal board for the LED module 402 to be placed on, and is formed into a disc shape by aluminum die casting. The LED module attachment component 403 is a heat dissipator which conducts heat generated by the LED module 402 to the heat sink 405. Power for turning on the LED module 402 is supplied to the LED module 402 from the drive circuit 407 via output wires 453a and 453b.

The globe 404 is a hemispherical, light-transmissive cover for allowing the light emitted by the LED module 402 to exit the lamp. The globe 404 covers the LED module 402. The end portion of the globe 404 at which the opening is provided abuts with and is positioned at the top surface of the LED module attachment component 403.

The heat sink 405 is a metal case made from a cylindrical heat dissipater having two openings in the vertical direction. The heat sink 405 is made from an aluminum alloy material. The surface of the heat sink 405 is treated with alumite to increase the thermal emittance.

The base 406 is a receiving part for receiving AC power from two points of contact. The power received by the base 406 is input to the power input part of the drive circuit 407 via a lead wire (not shown in the drawings).

The drive circuit 407 includes a plurality of circuit elements constituting a circuit for causing the LED chips of the LED module 402 to emit light, and a circuit board on which the circuit elements are mounted. The drive circuit 407 converts AC power received from the base 406 into SC power and supplies the converted DC power to the LED chips of the LED module 402 via the output wires 453a and 453b.

The resin case 408 is a case for housing the drive circuit 407 and has roughly the same shape as the heat sink 405. The resin case 408 is arranged so as to leave a gap between the heat sink 405 and the resin case 408.

The insulation ring 409 insulates the heat sink 405 from the base 406, and is positioned between the heat sink 405 and the base 406.

The outer case 410 is a resin case which covers the heat sink 405 and has roughly the same shape as the heat sink 405.

The potential-stabilizing wire 454 electrically connects the LED module attachment component 403 and the heat sink 405 to the circuit ground of the drive circuit 407. More specifically, one end of the potential-stabilizing wire 454 (the wire core) is soldered to the metal ground line on the circuit board of the drive circuit 407. In other words, one end of the potential-stabilizing wire 454 is connected to the circuit ground on the drive circuit 407. The other end of the potential-stabilizing wire 454 is inserted through the insertion hole provided at a position facing the LED module attachment component 403 of the resin case 408 and is drawn into the gap between the resin case 408 and the LED module attachment component 403. The potential-stabilizing wire 454 drawn from the resin case 408 extends through the gap between the resin case 408 and the LED module attachment component 403 to the edge of the LED module attachment component 403. At the edge of the LED module attachment component 403, the potential-stabilizing wire 454 is bent toward the globe 404 and pinched between the LED module attachment component 403 and the heat sink 405.

With this, in the light bulb-shaped lamp 400 according to Variation 2 of Embodiment 1, the potential-stabilizing wire 454 electrically connects the LED module attachment component 403 and the heat sink 405 to the circuit ground of the drive circuit 407. As such, the light bulb-shaped lamp 400 according to Variation 2 of Embodiment 1 achieves the same advantageous effects as Embodiment 1. In other words, since the potential of LED module attachment component 403 (the pedestal) and the heat sink 405 is made to be equal to the circuit ground of the drive circuit 407, it is possible to achieve the light bulb-shaped lamp 400 which suppresses noise.

Figure 9:
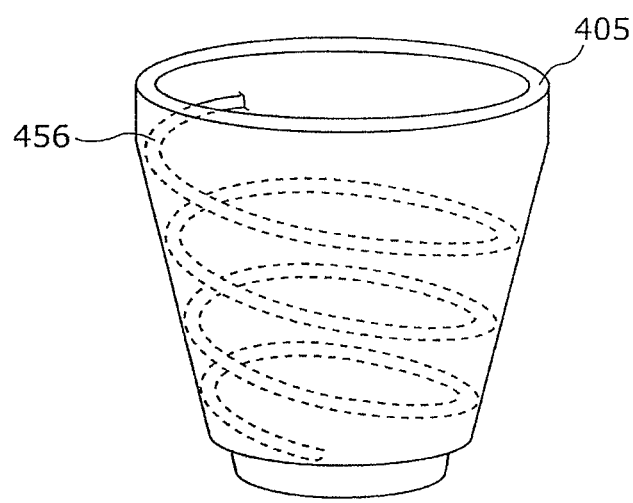
FIG. 9 is a perspective view of the heat sink and potential-stabilizing wire illustrating another example of the light bulb-shaped lamp according to Variation 2 of Embodiment 1.

It should be noted that in Variation 2 of Embodiment 1, the potential-stabilizing wire may be wound along the inner wall surface of the heat sink 405. A potential-stabilizing wire 456 shown in FIG. 9 is the same as the potential-stabilizing wire 454 described above except that it is wound along the inner wall surface of the heat sink 405 from the point it is drawn out from the resin case 408. The potential-stabilizing wire 456 winding along the inner wall surface of the heat sink 405 allows for the potential of the heat sink 405 to be stabilized without having to pinch the end of the potential-stabilizing wire 456 between the LED module attachment component 403 and the heat sink 405. In other words, the potential-stabilizing wire 456 can shield the heat sink 405.

Moreover, in Variation 2 of Embodiment 1, the potential-stabilizing wire 454 is bent toward the globe 404, but as long as the potential-stabilizing wire 454 is pinched between the heat sink 405 and the LED module attachment component 403, the potential-stabilizing wire 454 is not required to be bent. In this case, since the potential-stabilizing wire 454 is pinched between two metal components, electrical coupling is not weakened by a difference in rate of thermal expansion due to the change in temperature when turned on, and is advantageous against degradation over time.

Embodiment 2

Figure 10:
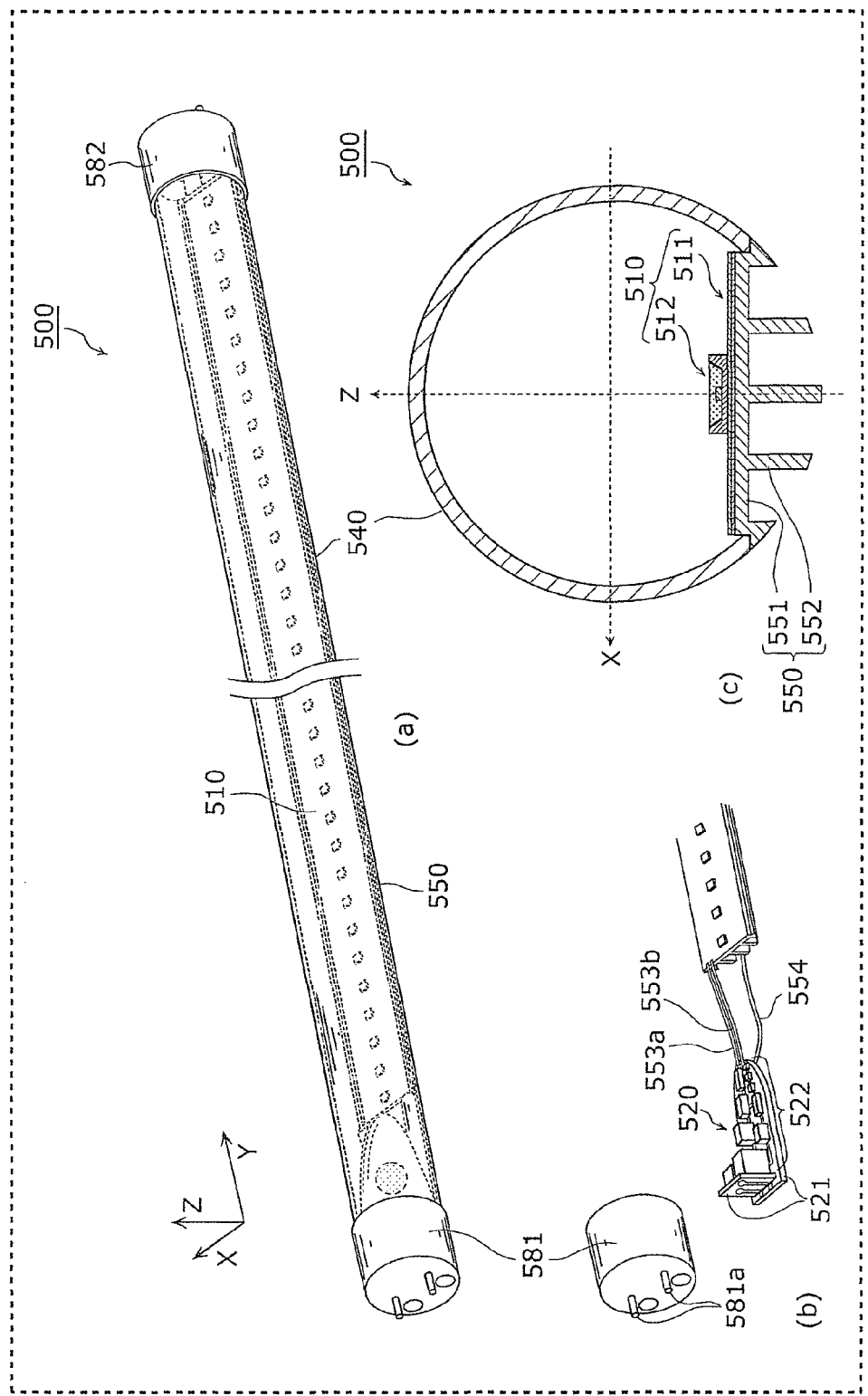
FIG. 10 is a cross section of the straight tube LED lamp according to Embodiment 2.

Next, Embodiment 2 of the present invention will be described with reference to FIG. 10. In Embodiment 2, the illumination light source will be exemplified as a straight tube LED lamp. FIG. 10 is a cross section of the straight tube LED lamp according to Embodiment 2 of the present invention.

As (a) through (c) in FIG. 10 show, a straight tube LED lamp 500 is an elongated lamp used as a substitute for a conventional straight tube fluorescent light (straight tube fluorescent lamp), and includes: an LED module 510, a drive circuit 520, a transmissive cover 540, a pedestal 550, and a pair of bases 581 and 582. Similar to the potential-stabilizing wire 154 in the light-bulb shaped LED lamp according to Embodiment 1, the straight tube LED lamp 500 includes a potential-stabilizing wire 554.

Hereinafter, each constituent component of the straight tube LED lamp 500 according to Embodiment 2 will be described.

(LED Module)

The LED module 510 is covered by the transmissive cover 540 and fixed to a mounting portion 551 of the pedestal 550. The LED module 510 is a surface mount device (SMD) light-emitting module, and is a line-shaped light source which emits light in the shape of a line. As (c) in FIG. 10 illustrates, the LED module 510 includes a mounting board 511, a plurality of LEDs 512 mounted in a line on the mounting board 511, metal lines (not shown in the drawings), and electrode terminals (not shown in the drawings).

DC voltage is supplied from the drive circuit 520 to the LED module 510 via output wires 553a and 553b.

(Drive Circuit)

The drive circuit 520 converts the AC power supplied to the straight tube LED lamp 500 to a predetermined DC power, and supplies the converted DC power to the LED module 510 via the output wires 553a and 553b. The circuit ground of the drive circuit 520 is electrically connected to the pedestal 550 via the potential-stabilizing wire 554.

(Transmissive Cover)

The transmissive cover 540 is configured so as to cover the LED module 510. The transmissive cover 540 is an elongated cover component making up the outer surface of the lamp case. The transmissive cover 540 is made from a circular cylinder having a portion thereof cut out, such as a substantially semi-cylindrical component. The main opening, which is the cut out portion, extends along a portion of the elongated cylinder in the longitudinal direction (tube axis).

(Pedestal)

The pedestal 550 is a supporting pedestal for holding (supporting) the LED module 510, and is integrally formed with the transmissive cover 540 in an elongated shape so as to close off the main opening of the transmissive cover 540. The inner portion on the transmissive cover side of the pedestal 550 is the flat mounting portion 551 on which the LED module 510 is mounted.

Moreover, the pedestal 550 functions as a heat sink which dissipates heat generated by the LED module 510. As such, the back surface of the pedestal 550 is exposed toward the outside of the straight tube LED lamp 500. More specifically, the outer portion, which is the back surface of the mounting surface of the pedestal 550, is provided with heat dissipation fins 552 as a heat dissipation portion. The heat dissipation fins 552 are exposed to the outside of the straight tube LED lamp and project outward relative to the straight tube LED lamp from the mounting portion 551. The heat dissipation fins 552 according to Embodiment 2 are made up of a plurality of substantially plate-shaped members extending along the Y axis.

The pedestal 550 is preferably made from a material with high heat conductive properties, such as metal. In Embodiment 2, the pedestal 550 is made from extruded aluminum.

The pedestal 550 is electrically connected to the circuit ground of the drive circuit 520 via the potential-stabilizing wire 554.

(Base)

The bases 581 and 582 are provided at both ends of the transmissive cover 540 in the longitudinal direction.

The base 581 is an electricity receiving base which receives electricity for lighting the LEDs 512 from outside the lamp and supplies power to the LED module 510. The base 581 is configured so as to latch with the socket of the lighting fixture and hold the LED lamp. The base 581 is a closed-bottom substantially circular cylindrical structure made from a composite resin such as poly butylene terephthalate (PBT). The base 581 is provided so as to cover the opening of one side of the case, which is configured of the transmissive cover 540 and the pedestal 550, in the longitudinal direction. It should be noted that the base 581 is provided with a pair of power feeder pins 581a. The power feeder pins 581a are power receiving pins which receive, from the lighting fixture, for example, power for turning on the LEDs 512 of the LED module 510 (for example, 100 V utility AC power).

The base 582 is a non-feeding base. In other words, the base 582 has the function of attaching the straight tube LED lamp 500 to the lighting fixture. Similar to the base 581, the base 582 is a closed-bottom substantially circular cylindrical structure made from a composite resin such as poly butylene terephthalate PBT. The base 582 is provided so as to cover the opening of the other side of the case, which is configured of the transmissive cover 540 and the pedestal 550, in the longitudinal direction. It should be noted that the base 582 is provided with a non-power feeder pin. In this case, the base 582 may be provided with a grounding function.

(Potential-Stabilizing Wire)

One end of the potential-stabilizing wire 554 (the wire core) is soldered to the metal ground line on the circuit board of the drive circuit 520. In other words, one end of the potential-stabilizing wire 520 is connected to the circuit ground on the drive circuit 150. The other end of the potential-stabilizing wire 554 (the wire core) is soldered to the pedestal 550.

As such, the pedestal 550 is connected to the circuit ground of the drive circuit 520 via the potential-stabilizing wire 554.

With this, in the straight tube LED lamp 500 according to Embodiment 2, the potential-stabilizing wire 554 electrically connects the circuit ground of the drive circuit 520 and the pedestal 550. As such, the straight tube LED lamp 500 according to Embodiment 2 achieves the same advantageous effects as Embodiment 1. In other words, since the potential of the pedestal 550 can be made to be equal to the circuit ground of the drive circuit 520, it is possible to achieve the straight tube LED lamp 500 in which noise is suppressed.

Embodiment 3

Figure 11:
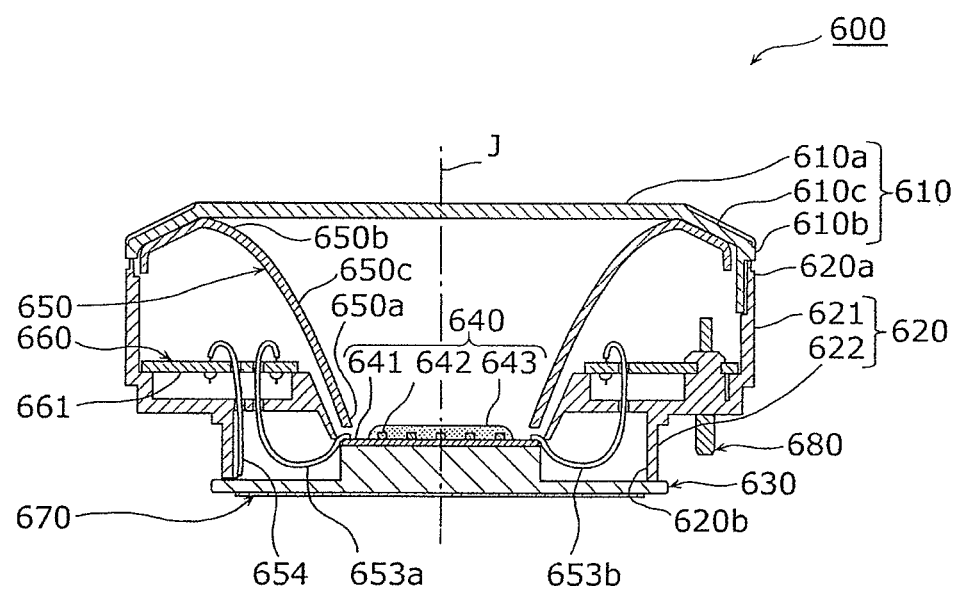
FIG. 11 is a cross section of the LED unit according to Embodiment 3.

Next, Embodiment 3 of the present invention will be described with reference to FIG. 11. In Embodiment 3, the illumination light source will be exemplified as an LED unit having a low-profile structure and a GX53 or GH76p base. FIG. 11 is a cross section of the LED unit 600 according to Embodiment 3 of the present invention.

As is illustrated in FIG. 11, the LED unit 600 according to Embodiment 3 is a low-profile LED unit having an overall disc-like or relatively thin structure. The external enclosure of the LED unit 600 consists of a transmissive cover 610, a case 620, and a support base 630. A GX53 or GH76p base, for example, is used as the base of the LED unit 600.

The LED unit 600 is attached to the lighting fixture by being rotated in a predetermined rotational direction, as will be described later. In Embodiment 3, the term "predetermined rotational direction" refers to the direction of the rotation of the LED unit 600 when it is rotated about the lamp axis J as an axis of rotation.

As is illustrated in FIG. 11, the LED unit 600 according to Embodiment 3 includes the transmissive cover 610, the case 620, the support base 630 (the pedestal), an LED module 640, a reflection plate 650, a drive circuit 660, and a heat conductive sheet 670. The LED unit 600 further includes a potential-stabilizing wire 654 electrically connecting the circuit ground of the drive circuit 660 and the support base 630.

The transmissive cover 610 is made of a translucent material to guide light emitted from the LED module 640 outside the lamp, and is for example made using a resin material such as acryl (PMMA) or polycarbonate (PC). The transmissive cover 610 may be a structure which diffuses light, or may be a structure which does not diffuse light. For example, the transmissive cover 610 can be configured to have light diffusion properties by forming a white light diffusing film by coating the inner surface of the transmissive cover 610 with a white pigment or resin containing a light diffusing material such as silica or calcium carbonate, or forming minute indentations in the transmissive cover 610.

Moreover, the transmissive cover 610 is provided over a first opening portion 620a of the case 620. The transmissive cover 610 according to Embodiment 3 is fixed to the case 620 so as to cover the first opening portion 620a to protect the LED module 640 and the drive circuit 660 provided in the case 620.

The case 620 is a low-profile cylindrical component which houses the LED module 640, and as is illustrated in FIG. 11, includes the first opening portion 620a formed on the light emission side of the case 620 and a second opening portion 620b formed on the side opposite the light emission side of the case 620. It should be noted that the reflection plate 650 and the drive circuit 660 are also housed in the case 620.

The case 620 according to Embodiment 3 is configured of a large diameter portion 621 made of a thin cylindrical component large in diameter, and a small diameter portion 622 made of a thin cylindrical component small in diameter. The small diameter portion 622 projects from the bottom surface of the large diameter portion 621 toward the side opposite the light emission side. It should be noted that the first opening portion 620a is formed on the large diameter portion 621, and the second opening portion 620b is formed on the small diameter portion 622.

As is illustrated in FIG. 11, the transmissive cover 610 is attached to the first opening portion 620a of the case 620

(large diameter portion 621). The case 620 is fastened to the support base 630 with, for example, three screws. The case 620 is made of a resin having insulating properties, such as polybutylene terephthalate (PBT). It should be noted that the case 620 is not required to be made from resin, and may be made from metal.

The support base 630 is a supporting member which supports the LED module 640 and the case 620. Moreover, the support base 630 also functions as a heat sink for the heat generated by the LED module 640. As such, the support base 630 may be made of metal such as aluminum or a resin having a high rate of heat conductivity. As is illustrated in FIG. 11, the support base 630 is arranged to cover the second opening portion 620b of the case 620 (small diameter portion 622).

Moreover, the support base 630 is connected to the lighting fixture via the heat conductive sheet 670. The support base 630 functions as a predetermined base which connects to the lighting fixture as well as the case 620. The LED unit 600 according to Embodiment 3 has a standard base size which corresponds with the socket of the lighting fixture. Examples include a GX35 base or a GH76p base, as described above.

The LED module 640 is the light source in the LED unit 600 and emits light of a predetermined color (wavelength), such as a white light. As is illustrated in FIG. 11, the LED module 640 is placed on and fixed to the support base 630. The LED module 640 can be fixed to the support base 630 by, for example, applying an adhesive agent between a board 641 and the support base 630.

The LED module 640 emits light using power supplied from the drive circuit 660. The light radiated from the LED module 640 passes through the transmissive cover 610 and is emitted out of the lamp.

As is illustrated in FIG. 11, the LED module 640 can be configured of the board 641 (the module board), an LED 642 (a light-emitting element), and a sealing component 643, for example.

The LED module 640 according to Embodiment 3 has a chip on board (COB) type structure in which a bare chip (LED 642) is mounted directly on the board 641. Although not shown in the drawings, it should be noted that metal wiring of a predetermined shape for electrically connecting the LEDs 642 together and terminals which receive power for causing the LEDs 642 to emit light, for example, are provided on the board 641.

A ceramic board, resin board, or a metal based board may be used as the board 641. Regarding the shape of the board 641, a board that is rectangular in a planar view can be used, but a board that is polygonal such as a hexagonal or octagonal board, or a round board may be used as well.

The LEDs 642 are one example of a light-emitting element, and are semiconductor light-emitting elements which emit light using a predetermined power. The LEDs 642 according to Embodiment 3 are bare chips which emit a monochromatic visible light. For example, a blue LED chip which emits a blue light when power passes through it can be used as the LED 642. A plurality of the LEDs 642 are mounted in a plurality or rows or a matrix on the main surface of the board 641, for example.

The sealing component 643 is made from, for example, resin, and is formed to seal the plurality of LEDs 642 collectively.

As is illustrated in FIG. 11, the reflection plate 650 (reflecting mirror) is positioned between the transmissive cover 610 and the LED module 640. The reflection plate 650 is a reflection member having reflective properties, and includes an entrance opening (first opening) 650a through which light from the LED module 640 enters and an exit opening (second opening) 650b through which light coming through the entrance opening 650a exits from the reflection plate 650. The reflection plate 650 according to Embodiment 3 is configured to have a diameter that gradually increases from the entrance opening 650a toward the exit opening 650b. More specifically, the reflection plate 650 is trumpet (funnel) shaped.

The entrance opening 650a is configured to surround the light emission region of the LED module 640 (the region in which the sealing component 643 is formed). Moreover, the surface area of the exit opening 650b is approximately the same as the surface area of a flat surface portion 610a of the transmissive cover 610.

The inner surface of the reflection plate 650 is a reflective surface 650c which reflects the light from the LED module 640. The reflective surface 650c is configured to reflect light entering from the entrance opening 650a and emit the light out from the exit opening 650b. The light from the LED module 640 is guided to the transmissive cover 610 by the reflection plate 650.

The reflection plate 650 can be configured of a hard white resin material having insulating properties, for example. It should be noted that in order to increase reflectivity, the reflective surface 650c may be coated on the inner surface of the resin reflection plate 650 as a metal deposition film (metal reflective film) made from a metallic material such as silver or aluminum. Moreover, without using a resin material, the reflection plate 650 may be entirely made from a metallic material such as aluminum.

The drive circuit 660 is a drive circuit for turning on the LED module 640 (the LEDs 642), and supplies a predetermined power to the LED module 640. For example, the drive circuit 660 includes lighting circuitry which converts AC power (for example, power from an AC 100V utility power supply) supplied to the LED unit 600 into DC power, and supplies the converted DC power to the LED module 640. More specifically, the drive circuit 660 supplies, from the drive circuit 660 to the LED module 640 (the LEDs 642), the converted DC power, to the LED unit 600 (LEDs 642), via output wires 653a and 653b. It should be noted that the power supplied to the drive circuit 660 may be DC power instead of AC power.

The drive circuit 660 includes a circuit board 661 and a plurality of circuit elements (not shown in the drawings) mounted on the circuit board 661.

The circuit board 661 is a printed board on which metal lines are patterned. The circuit board 661 according to Embodiment 3 is a ring shaped (donut shaped) board having a circular opening, and is arranged inside the case 620, outside the reflection plate 650.

Examples of the circuit elements include semiconductor elements such as capacitive elements like electrolytic and ceramic capacitors, resistors, inductors, chokes (choke transformers), noise filters, diodes, and integrated circuit elements. The majority of the circuit elements are mounted on the main surface on the light emission side of the circuit board 661.

The drive circuit 660 configured in this way is housed in the case 620, and for example, is secured in the case 620 by the circuit board 661 and the case 620 being fastened together. It should be noted that when the case 620 is made of metal, it is preferable that the drive circuit 660 be housed inside a circuit case having insulating properties. Moreover, in addition to the lighting circuitry, light adjusting circuitry, vasopressure circuitry or other control circuitry may be selected as needed and paired with the drive circuit 660.

The heat conductive sheet 670 assists in letting heat from the LED module 640 conducted via the support base 630 escape to the lighting fixture. More specifically, the heat conductive sheet 670 is a resin sheet having a high rate of heat conductivity, and can be a silicon sheet or an acryl sheet.

The potential-stabilizing wire 654 electrically connects the circuit ground of the drive circuit 660 and the support base 630. More specifically, one end of the potential-stabilizing wire 654 (the wire core) is soldered to the metal ground line on the circuit board of the drive circuit 660. In other words, one end of the potential-stabilizing wire 654 is connected to the circuit ground on the drive circuit 660. The other end of the potential-stabilizing wire 654 is inserted in an insertion hole provided in the small diameter portion 622 of the case 620, and extends to the opening portion 620b of the case 620. In the opening portion 620b of the case 620, the potential-stabilizing wire 654 bends outward, and is pinched between the opening portion 620b of the case 620 and the support base 630.

Here, as FIG. 11 shows, the wire core of the potential-stabilizing wire 654 is covered by the resin coating in the case 620, and bare at the ends thereof. Moreover, the potential-stabilizing wire 654 extending to the opening portion 620b of the case 620 is, at the edge of the opening portion 620b of the case 620, pinched between the opening portion 620b of the case 620 and the support base 630. In other words, the potential-stabilizing wire 654 electrically connects the support base 630 and the case 620 to the circuit ground of the drive circuit 660.

With this, in the LED unit 600 according to Embodiment 3, the potential-stabilizing wire 654 electrically connects the circuit ground of the drive circuit 660, the support base 630, and the case 620. As such, the LED unit 600 according to Embodiment 3 achieves the same advantageous effects as Embodiment 1. In other words, since the potential of the support base 630 (the pedestal) and the case 620 can be made to be equal to the circuit ground of the drive circuit 660, it is possible to achieve the LED unit 600 in which noise is suppressed.

Embodiment 4

The present invention can be achieved not only as the illumination light sources described in Embodiments 1 through 3, but also as a lighting apparatus including an illumination light source. Next, the lighting apparatus according to Embodiment 4 of the present invention will be described with reference to FIG. 12.

Figure 12:
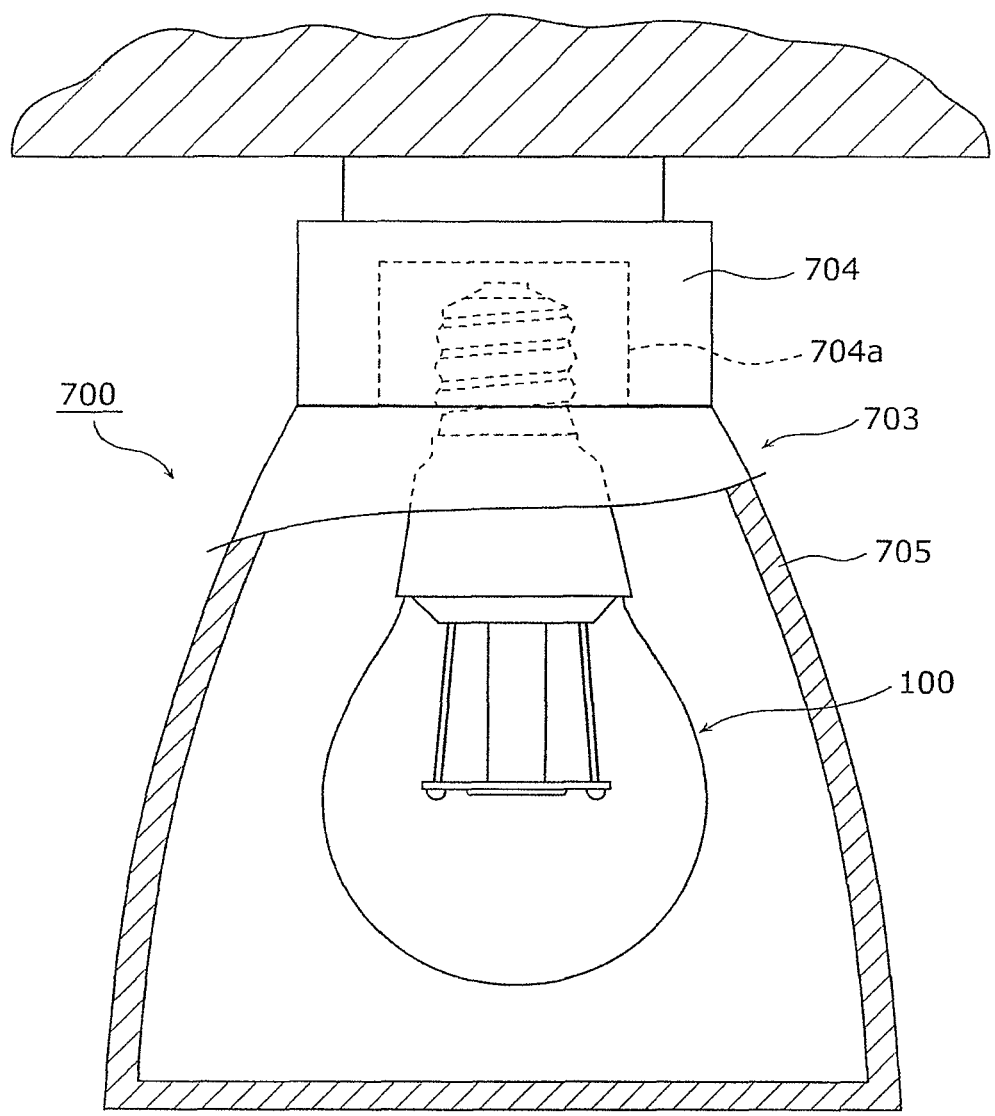
FIG. 12 is a cross section of the basic structure of the lighting apparatus according to Embodiment 4.

FIG. 12 is a cross section of the basic structure of the lighting apparatus 700 according to Embodiment 4 of the present invention.

As is illustrated in FIG. 12, the lighting apparatus 700 according to Embodiment 4, is, for example, used after being attached to an indoor ceiling, and includes the light bulb-shaped lamp 100 according to Embodiment 1 and a light fixture 703.

The light fixture 703 is for turning on and off the light bulb-shaped lamp 100, and includes a fixture body 704 that attaches to a ceiling and a light-transmissive lamp cover 705 that covers the light bulb-shaped lamp 100.

The fixture body 704 has a socket 704a. The base 190 of the light bulb-shaped lamp 100 screws into the socket 704a. Power is supplied to the light bulb-shaped lamp 100 via the socket 704a.

The lighting apparatus 700 configured in this manner is capable of suppressing noise.

Supplementary Description of Embodiments

It should be noted that in the above descriptions, the drive circuit 150 is a self-commutated inverter, but the configuration of the drive circuit 150 is not limited to this example. For example, the drive circuit 150 may have a configuration in which a chopper circuit is used. Moreover, the inverter does not need to be self-commutating. An externally commutated inverter will achieve the same advantageous effects. Furthermore, as long as the output wire to the LED module oscillates at a frequency higher than the power source frequency, a different type will still achieve a favorable effect, and the greater the output power, the greater the effect achieved will be. In other words, it is possible to suppress noise to a large extent.

Moreover, in the above-described illumination light source, the drive circuit may include a direct current power source circuit that converts a first alternating current voltage inputted to the illumination light source to direct current voltage and outputs the converted direct current voltage; and a high frequency generator circuit that includes an inverter circuit including a switching element, an inductor, and a capacitor, and converts the direct current voltage outputted from the direct current power source circuit to a second alternating current voltage of higher frequency than a frequency of the first alternating current voltage, and the output wire may have a potential that varies in synchronization with a switching operation of the switching element. For example, in Embodiment 1, the first rectifier circuit 210 and the smoothing capacitors C1 and C2 are one example of a DC power source circuit that converts the first AC voltage (for example, 50 Hz or 60 Hz AC voltage) into DC voltage, and the inverter 220 is one example of the high frequency generator circuit that converts the first AC voltage into the second AC voltage (for example, 50 kHz AC voltage).

Moreover, the support 130 may have, for example, a hollow-structured cylindrical shape having a constant cross-sectional area (an area in a cross section obtained when the support 130 is cut through along a plane normal to the axis thereof), and may have a configuration in which the output wires 153a and 153b are disposed in the hollow structure of the support 130. With this, the noise radiating from the output wires 153a and 153b—that is to say, fluctuations in the electrical field generated by the output wires 153a and 153b—is shielded by the support 130 and kept from radiating out of the support 130.

Moreover, in the above descriptions, the pedestal 145, the heat sink 170, the LED module attachment component 403, the heat sink 405, the pedestal 550, the support base 630, and the case 620 are used as examples of the metal component electrically connected to the circuit ground of the drive circuit via the potential-stabilizing wire, but the configuration of the metal component is not limited to these examples. In other words, the metal component may be any metallic structural component having an illumination light source. Specifically, the metallic structural component is a metal component that is electrically floating before the potential-stabilizing wire is electrically connected—that is to say, is a floating metal component. By electrically connecting the floating metal component to the circuit ground of the drive circuit with the potential-stabilizing wire, it possible to make the potential of the floating metal component equal to the circuit ground of the drive circuit. As a result, the noise radiating from at least one of the output wire or the drive circuit propagates to the floating metal component, making it possible to reduce the noise radiating from the floating metal component.

The closer this sort of floating metal component is positioned to at least one of the output wire or the drive circuit, the more easily noise emitted from the one of the output wire or the drive circuit propagates. As such, by connecting the floating metal component places near at least one of the output wire or the drive circuit in the illumination light source to the reference potential of the drive circuit via the potential-stabilizing wire, it is possible to suppress noise generated in the illumination light source.

Moreover, in the above descriptions, the circuit ground of the drive circuit is used as the reference potential, but the reference potential is not limited to a circuit ground, and may be any stable potential on the drive circuit, such as a potential different from the DC potential relative to the circuit ground. Furthermore, the reference potential may be a stable potential relative to the earth potential. Additionally, if a slight increase is acceptable, two capacitors connected in series may be connected between the AC power source wires, and the reference potential may be the midpoint thereof. In other words, the potential at the connection point of the two capacitors connected in series may be used as the reference potential.

Moreover, the method of connecting the potential-stabilizing wire to the pedestal is not limited to the above-described method of fixing by pinching. For example, a locking screw may be used, soldering may be used, or conductive tape may be used.

Moreover, in Embodiment 1, the location where the potential-stabilizing wire 154 is drawn out from the circuit case 160 is not limited to the insertion hole formed on the surface facing the mounting 140 of the circuit case 160, as is illustrated in FIG. 2. For example, the potential-stabilizing wire 154 may be drawn from a slit formed in the case body portion 161 of the circuit case 160.

Moreover, a leg of the capacitor C17 may be used as the potential-stabilizing wire 154 instead of providing a new lead wire as the potential-stabilizing wire 154. More specifically, a leg of the capacitor C17 may be placed along the mounting 140 of the pedestal 145, and the end portion of this leg of the capacitor C17 may be pinched between the pedestal 145 and the opening portion 170a of the heat sink 170.

Moreover, the potential-stabilizing wire 154 may be a lead wire whose core wire is exposed, rather than the potential-stabilizing wire 154 covered with the resin coating.

In addition, although an LED is used in the above embodiments as an example of a light-emitting element, a semiconductor light-emitting element such as a semiconductor laser, a solid light-emitting element such as an organic or inorganic electroluminescence (EL) element may be used.

The scope of the present invention may also include embodiments as a result of adding various modifications to the embodiments that may be conceived by those skilled in the art, and embodiments obtained by combining constituent elements in the embodiments in any manner as long as the combination does not depart from the spirit of the present invention.

The invention claimed is:

1. An illumination light source comprising:
   a module board on which a light-emitting element is mounted;
   a circuit board on which a drive circuit that turns on the light-emitting element is mounted;
   an output wire for supplying power for turning on the light-emitting element from the drive circuit to the light-emitting element;
   a metal component; and
   a reference potential wire electrically connecting the metal component to a reference potential of the drive circuit,
   wherein the reference potential wire is fixed to the metal component.

2. The illumination light source according to claim 1, wherein the metal component is a metallic structural component.

3. The illumination light source according to claim 1, wherein the metal component is a pedestal that supports the module board.

4. The illumination light source according to claim 3, wherein the metal component is a heat sink that is thermally connected to the module board via the pedestal, the heat sink being for dissipating heat generated by the light-emitting element, and
   the heat sink surrounds the drive circuit.

5. The illumination light source according to claim 4, wherein the heat sink includes an opening portion into which the pedestal is fit, and
   the reference potential wire is pinched between the pedestal and the opening portion of the heat sink.

6. The illumination light source according to claim 3, wherein the pedestal is elongated.

7. The illumination light source according to claim 1, further comprising
   a low-profile case that houses the module board and the circuit board.

8. The illumination light source according to claim 1, wherein the reference potential wire is wound around the metal component.

9. The illumination light source according to claim 1, further comprising
   a capacitor connected in series with the reference potential wire, between the reference potential of the drive circuit and the metal component.

10. The illumination light source according to claim 1, wherein the reference potential wire is a stranded wire.

11. The illumination light source according to claim 1, wherein the reference potential of the drive circuit is a ground potential of the drive circuit.

12. The illumination light source according to claim 1, wherein the drive circuit includes:
    a direct current power source circuit that converts a first alternating current voltage inputted to the illumination light source to direct current voltage and outputs the converted direct current voltage; and
    a high frequency generator circuit that includes an inverter circuit including a switching element, an inductor, and a capacitor, and converts the direct current voltage outputted from the direct current power source circuit to a second alternating current voltage of higher frequency than a frequency of the first alternating current voltage, and
    the output wire has a potential that varies in synchronization with a switching operation of the switching element.

13. A lighting apparatus comprising
    the illumination light source according to according to claim 1.

14. The illumination light source according to claim 1, wherein the reference potential wire is fixed to the metal component by pinching.

15. The illumination light source according to claim 1, wherein the reference potential wire is fixed to the metal component by a screw.

16. The illumination light source according to claim 1, wherein the reference potential wire is fixed to the metal component by soldering.

17. An illumination light source comprising:
a module board on which a light-emitting element is mounted;
a circuit board on which a drive circuit that turns on the light-emitting element is mounted;
an output wire for supplying power for turning on the light-emitting element from the drive circuit to the light-emitting element;
a metal component electrostatically coupled with the output wire; and
a reference potential wire electrically connecting the metal component to a reference potential of the drive circuit.

* * * * *